United States Patent [19]

Woods et al.

[11] 4,091,455

[45] May 23, 1978

[54] INPUT/OUTPUT MAINTENANCE ACCESS APPARATUS

[75] Inventors: John M. Woods, Glendale; Marion G. Porter; Earnest M. Monahan, both of Phoenix, all of Ariz.

[73] Assignee: Honeywell Information Systems Inc., Waltham, Mass.

[21] Appl. No.: 752,345

[22] Filed: Dec. 20, 1976

[51] Int. Cl.$^2$ .................. G06F 15/16; G06F 11/00
[52] U.S. Cl. ................ 364/200; 235/303.4; 235/304
[58] Field of Search ............... 364/200; 235/153 AK

[56] References Cited

U.S. PATENT DOCUMENTS

| | | | |
|---|---|---|---|
| 3,557,315 | 1/1971 | Kubus | 235/153 AK |
| 3,641,505 | 2/1972 | Artz | 364/200 |
| 3,678,467 | 7/1922 | Nussbaum | 364/200 |
| 3,828,321 | 8/1974 | Wilber | 364/200 |
| 3,838,261 | 9/1974 | Rice | 235/153 AK |
| 3,864,670 | 2/1975 | Inoue | 364/200 |
| 3,898,621 | 8/1975 | Zelwski | 364/200 |
| 3,921,141 | 11/1975 | Wilber | 364/200 |

*Primary Examiner*—James D. Thomas

*Attorney, Agent, or Firm*—Faith F. Driscoll; Nicholas Prasinos; Ronald T. Reiling

[57] ABSTRACT

An input/output processing system comprises a number of modules including at least a pair of processing units connected to operate as a logical pair and a system interface unit having a number of ports. Each port connects to a different one of the modules for interconnecting pairs of modules for communication over a number of switching circuit networks included in the system interface unit. The system interface unit further includes control logic circuits for disconnecting each processor of the logical pair preventing the disconnected processing unit from communicating with other modules. The control logic circuits further include circuits which in response to special commands from a good processor are operative to condition via a special line, circuits in the disconnected processing unit to apply status signals representative of the contents of a control register to the system interface unit. The other circuits within the system interface unit in response to a further command condition certain switching circuit networks for loading the status signals into one of the registers included in the system interface unit for subsequent analysis by system routines.

30 Claims, 26 Drawing Figures

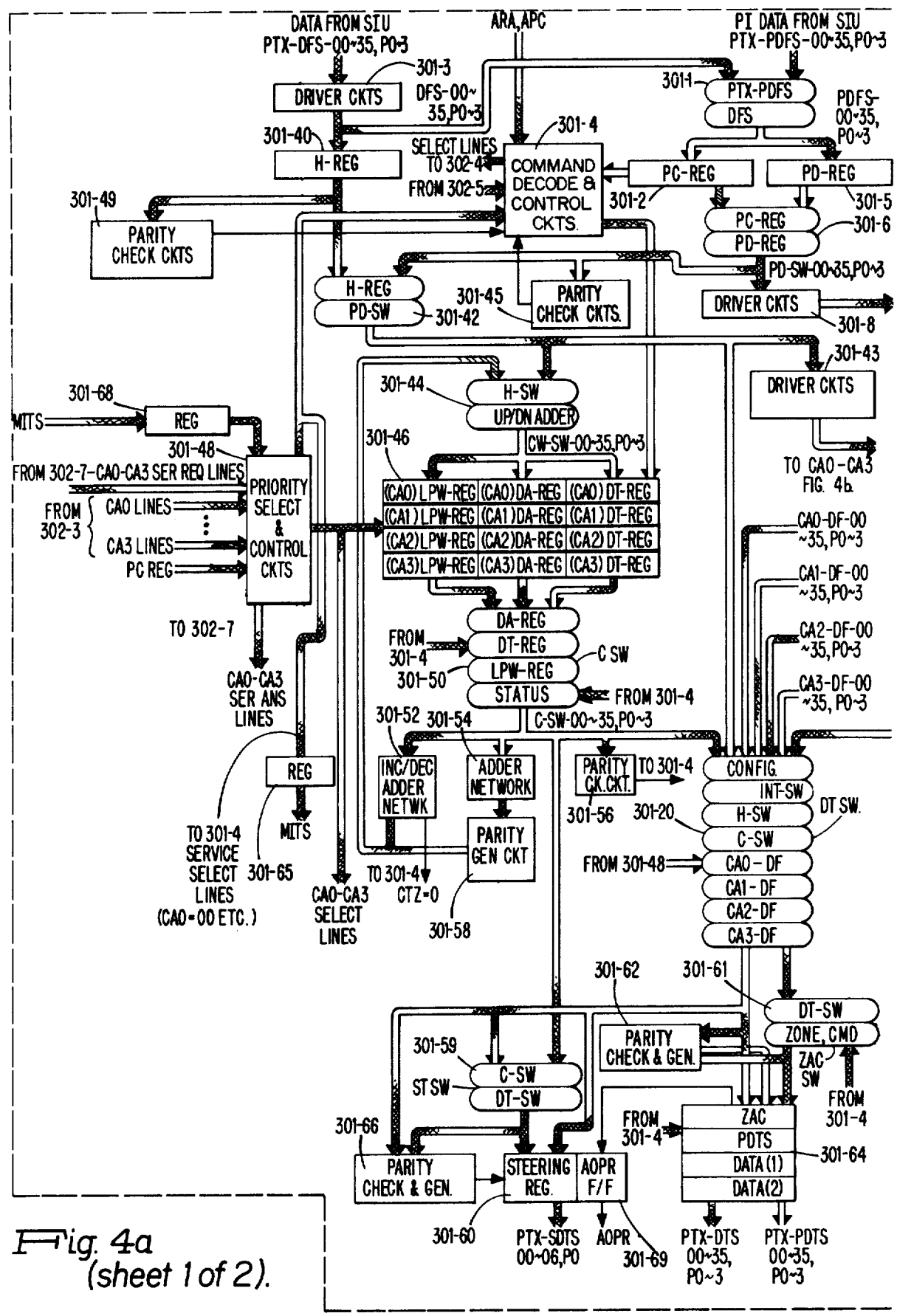
Fig. 4a (sheet 1 of 2).

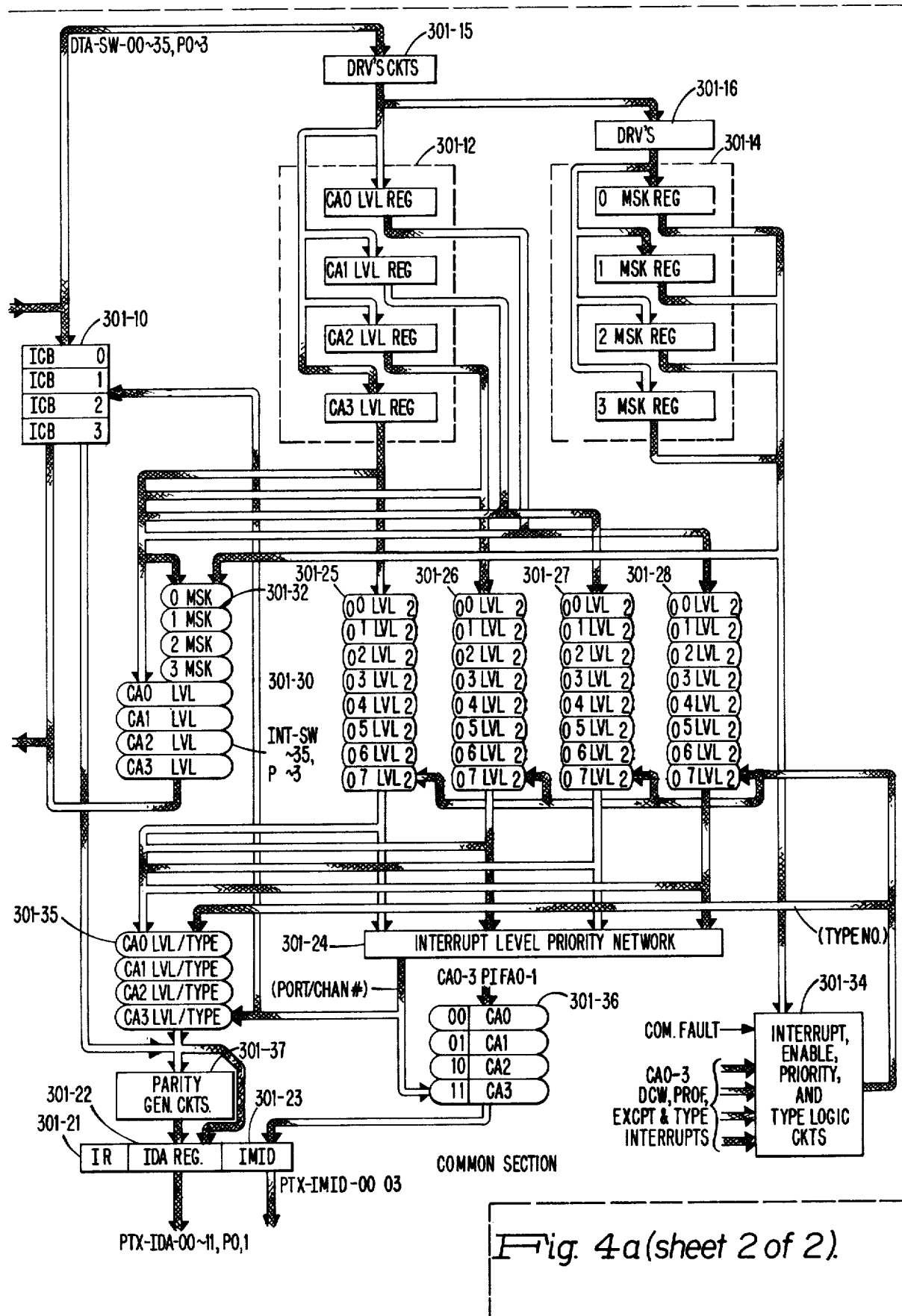
Fig. 4a (sheet 2 of 2).

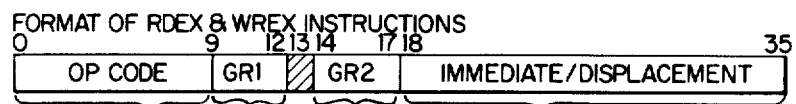
Fig. 6.
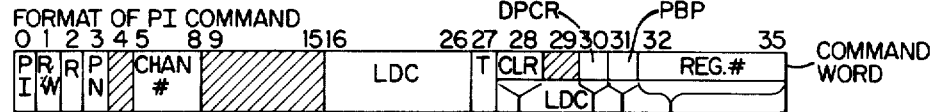
Fig. 7a.
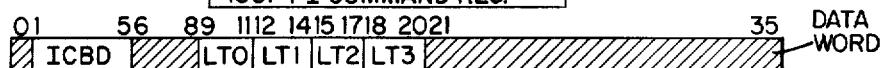
Fig. 7b.
Fig. 7c.
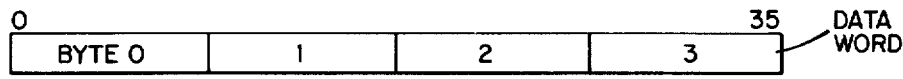

CONFIGURATION REGISTER 00₈

| 0 | 8 9 | 23 24 | 27 28 | 29 30 31 | 34 35 |
|---|-----|-------|-------|----------|-------|
| SIU I.D. | OPI'S | PID | E A I P | RFU | PC | L M |

BIT 28 = EAIP = ENABLE ALTERNATE INTERRUPT PATH
RFU = RESERVED FOR FUTURE USE
\* PC = PROCESSOR CONFIGURATIONS
BITS 31,32 = MODULE NO.1 CONFIGURATION
   X  X-MODULE F ENABLED (1=ENABLED)
          MODULE E ENABLED (1=ENABLED)
BITS 33,34 = MODULE NO. 0 CONFIGURATION
   X  X-MODULE H ENABLED (1=ENABLED)
          MODULE G ENABLED (1=ENABLED)
  LM = LOCAL MEMORY ASSIGNMENT
      1=LOCAL MEMORY PORT 1 TO BE ACCESSED FOR BOOTLOAD
      0=LOCAL MEMORY PORT 0 TO BE ACCESSED FOR BOOTLOAD
\* BITS 31-32 OR
      33-34 = 11 MEANS THAT THE PROCESSORS ARE BOTH ENABLED, LOCKED AND RUNNING IN THE COMPARE MODE

SIU I.D. = SIU = 200₈ (010000000)
OPI'S = BIT 9 = OPI PRESENT ON PORT A
        10 = OPI PRESENT ON PORT B
        •
        •
        18 = OPI PRESENT ON PORT K
        19 = OPI PRESENT ON LM0
        20 = OPI PRESENT ON LM1
        21 = OPI PRESENT ON RM0
        22 = OPI PRESENT ON RM1
        23 = RFU
PID = PROCESSOR IDENTIFIERS
BIT 24 = 1 = MODULE PRESENT ON PORT E IS A PROC.
     25 = 1 = MODULE PRESENT ON PORT E HAS A PI INTERFACE
     26 = 1 = MODULE PRESENT ON PORT F IS A PROC.
     27 = 1 = MODULE PRESENT ON PORT F HAS A PI INTERFACE

*Fig. 8a.*

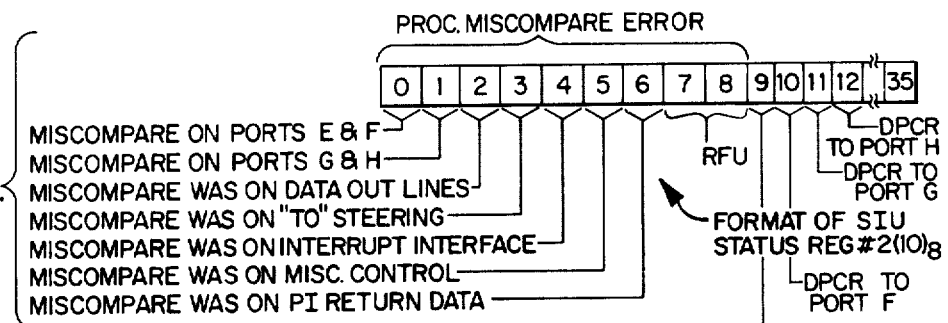

Fig. 8d.
MISCOMPARE ON PORTS E & F
MISCOMPARE ON PORTS G & H
MISCOMPARE WAS ON DATA OUT LINES
MISCOMPARE WAS ON "TO" STEERING
MISCOMPARE WAS ON INTERRUPT INTERFACE
MISCOMPARE WAS ON MISC. CONTROL
MISCOMPARE WAS ON PI RETURN DATA

FORMAT OF SIU STATUS REG #2(10)₈
DPCR TO PORT H
DPCR TO PORT G
DPCR TO PORT F
DPCR TO PORT E

INITIALIZE REGISTER (4)₈

| 0 | 13 14 | 27 28 | 35 |
|---|-------|-------|----|
| PORT MASK CONTROL REG. | PORT INITIALIZE CONTROL REG. | NA |

BIT 0 = PORT A  1=SET MASK  0=RESET MASK
    •     •
   9 = PORT K  1=SET MASK  0=RESET MASK
BIT 14 = PORT A  1=SENT INITIALIZE TO PORT
    •
   23 = PORT K  1=SENT INITIALIZE TO PORT
NA = NOT AVAILABLE

*Fig. 8b.*

FAULT STATUS REGISTER #1(7)₈

| 0 | 11 12 | 15 16 | | 21 22 23 24 25 26 27 28 | 31 32 | 35 0 | 15 |
|---|---|---|---|---|---|---|---|
| SID ERRORS | PORT POINTER | SIE | R E / P P F | L L L L M M M M 0 1 2 3 | PEL | PTL | PORT DESIGNATIONS |

SID ERROR= STEERING, INTERRUPT & DATA ERRORS IN THE SIU INTERRUPT & MULTIPLEXING LOGIC CIRCUITS
  BIT 0 = PARITY ERROR ON "TO" STEERING
    1 = PARITY ERROR ON "RETURN" STEERING
    2 = PARITY ERROR ON INTERRUPT LEVEL
    3 = PARITY ERROR ON INTERRUPT ICBD
    4 = PARITY ERROR ON PI DATA FROM LOGIC MODULE
    5 = PARITY ERROR ON DATA FROM ACTIVE PORT
    6 = PARITY ERROR ON DATA FROM MEMORY
    7 = PARITY ERROR ON BITS 4,5 & 6 IS ON BYTE 0
    8 = PARITY ERROR ON BITS 4,5 & 6 IS ON BYTE 1
    9 = PARITY ERROR ON BITS 4,5 & 6 IS ON BYTE 2
   10 = PARITY ERROR ON BITS 4,5 & 6 IS ON BYTE 3
   11 = RFU
PORT POINTER= THE SIU PORT NUMBER FROM WHICH THE ERROR IN BITS 0-11 EMANATED.

| PORT NO. | PORT DESIGNATED |
|---|---|
| 1101 | A |
| 1001 | B |
| 1010 | C |
| • | • |
| • | G |
| • | H |
| • | • |
| 0010 | L |
| 0000 | LM0 |
| 0100 | LM1 |
| 1000 | REMA0 |
| 1100 | REMA1 |

SIE = SIU INTERNAL ERRORS (SIU = PORT L)
  BIT 16 = COMMAND PARITY ERROR ON PI TO SIU PORT L
    17 = PARITY ERROR ON WRITE PI DATA TO SIU PORT L
    18 = ERROR IN BITS 16 & 17 IS ON BYTE 0
    19 = ERROR IN BITS 16 & 17 IS ON BYTE 1
    20 = ERROR IN BITS 16 & 17 IS ON BYTE 2
    21 = ERROR IN BITS 16 & 17 IS ON BYTE 3
  RE = RESTRICTED ERROR
LM0-LM3 = ERROR INDICATED FROM LOCAL MEMORY
  PEL = PARITY ERROR LINES FROM PROCESSORS
  BIT 28 = PARITY ERROR INDICATED FROM PROCESSOR ON PORT E
    29 = PARITY ERROR INDICATED FROM PROCESSOR ON PORT F
    30 = PARITY ERROR INDICATED FROM PROCESSOR ON PORT G
    31 = PARITY ERROR INDICATED FROM PROCESSOR ON PORT H
  PTL = TROUBLE LINES FROM PROCESSORS
    32 = TROUBLE LINE FROM PROCESSOR ON PORT E
    33 = TROUBLE LINE FROM PROCESSOR ON PORT F
    34 = TROUBLE LINE FROM PROCESSOR ON PORT G
    35 = TROUBLE LINE FROM PROCESSOR ON PORT H
BITS 0-15 = PORT DESIGNATIONS
    THE ENCODED INFORMATION CONTAINED IN BITS 12-15 IS STORED IN BITS 0-15
    OF ANOTHER REGISTER PRIOR TO ENCODING.
  BIT 0 = PORT A
    1 = PORT B
    • •
    9   PORT K
  BIT 15 = REMA1

*Fig. 8c.*

INPUT/OUTPUT MAINTENANCE ACCESS APPARATUS

RELATED PATENT APPLICATIONS

1. "Input-Output Processing System Utilizing Locked Processors" invented by John M. Woods, et al, Ser. No. 741,632, filed on Nov. 15, 1976 and assigned to the same assignee as named herein.
2. "Steering Code Generating Apparatus For Use In An Input/Output Processing System" invented by Garvin Wesley Patterson, William A. Shelly, and Earnest M. Monahan Ser. No. 562,362, filed on Mar. 26, 1975 now U.S. Pat. No. 4,000,487 and assigned to the same assignee as named herein.
3. "A Pathfinder Microprogram Control Store" invented by Garvin Wesley Patterson and Marion G. Porter Ser. No. 562,363, filed on Mar. 26, 1975 now U.S. Pat. No. 4,001,788 and assigned to the same assignee as named herein.
4. "Priority Interrupt Mechanism" invented by Earnest M. Monahan, Garvin Wesley Patterson and Jaime Calle, Ser. No. 562,315, filed on Mar. 26, 1975 now U.S. Pat. No. 4,001,783 and assigned to the same assignee as named herein.
5. "Dispatcher Mechanism" invented by Earnest M. Monahan and Garvin Wesley Patterson, Ser. No. 562,314, filed on Mar. 26, 1975 now U.S. Pat. No. 4,028,664 and assigned to the same assignee as named herein.
6. "Fail Soft Memory" invented by Marion G. Porter, Jaime Calle, and Garvin Wesley Patterson, Ser. No. 562,361, filed on Mar. 26, 1975 now U.S. Pat. No. 4,010,450 and assigned to the same assignee as named herein.
7. "Instruction Look Ahead Having Prefetch Concurrency and Pipeline Features" invented by Marion G. Porter, Ser. No. 562,272, filed on Mar. 26, 1975 and assigned to the same assignee as named herein.
8. "Data Alignment Circuit" invented by Darrell L. Fett, Ser. No. 559,115, filed on Mar. 17, 1975 now U.S. Pat. No. 3,967,101 assigned to the same assignee as named herein.
9. "Processor for Input/Output Processing System" invented by Marion G. Porter, Garvin Wesley Patterson, William A. Shelly, and Nicholas S. Lemak, Ser. No. 562,317, filed on Mar. 26, 1975 now U.S. Pat. No. 3,976,977 and assigned to the same assignee as named herein.
10. "Method of Generating Addresses to a Paged Memory" invented by Garvin Wesley Patterson and Marion G. Porter, Ser. No. 562,330, filed on Mar. 26, 1975 now U.S. Pat. No. 3,976,978 and assigned to the same assignee as named herein.
11. "Memory Steering in a Data Processing System" invented by William A. Shelly, Ser. No. 562,313, filed on Mar. 26, 1975 now U.S. Pat. No. 3,990,051 and assigned to the same assignee as named herein.

BACKGROUND OF THE INVENTION

1. Field of Use

The present invention relates diagnostic apparatus and more specifically, apparatus for enabling diagnosis of a failed data processing unit.

2. Prior Art

A number of data processing system include apparatus which enables a "bad" unit or device to be deconfigured or logically disconnected from the system. When this occurs, the rest of the system is unable to communicate with the unit over any of the interfaces to which it connects. Hence, it is not possible to access any of the pertinent status registers for determining the reason for failure.

One way of gaining access to the bad unit is to include another path for accessing registers. However, this has been found to be costly and to require that a certain minimum amount of control logic circuits within the unit be operative to enable the transfer of signals across the interface.

Another disadvantage of the above is that in accessing internal information from the "bad" unit, it is possible to alter the state of the unit. This is particularly true when the "bad" unit is a processor.

Accordingly, it is a primary object of the present invention to provide apparatus for enabling access to internal information stored in a unit which has been logically disconnected from a system.

It is a more specific object of the present invention to provide an arrangement which provides internal information from a processing unit which has been logically disconnected from a system and inhibited from performing further operations.

SUMMARY OF THE INVENTION

The above objects are achieved in a preferred embodiment of the present invention which includes an input/output system comprising a plurality of modules including at least a pair of processing units connected to operate as a logical pair. A system interface unit has a plurality of ports, each of which connects to the interfaces of a different one of the modules for communication of information over a number of switching circuit networks included therein.

The system interface unit further includes control logic circuits for deconfiguring or disconnecting each processor of the logical pair, preventing the disconfigured processing unit from communicating with other modules. The control logic circuits include circuits which are connected to respond to special commands from the other processing unit and apply signals to a predetermined line of one of the interfaces for conditioning circuits in the deconfigured processing unit.

The conditioned processing unit circuits apply status signals representative of at least one program control register to another one of the interfaces. Other circuits within the system interface unit in response to further commands condition certain ones of the switching circuit networks for loading the status signals into one of the registers of the system interface unit.

The above arrangement enables the operating system software to have access to pertinent status information notwithstanding the fact that it no longer has control over the operation of the deconfigured processing unit. Moreover, the status signals are obtained without causing any alteration in the state of the deconfigured processing unit.

In accordance with the present invention, access to status information is permitted by the inclusion of a minimum of circuits. Of course this improves the reliability of the overall system and greatly facilitates diagnosis of faults detected within any one of the processing units.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 6 illustrates the format of WREX and RDEX program instructions.

FIGS. 7a through 7c illustrate the formats of interface commands.

FIGS. 8a through 8d illustrate the formats of the contents of different registers included in the system interface unit 100 of FIG. 1.

TABLE OF CONTENTS

Description of the Preferred Embodiment

Figure 2:
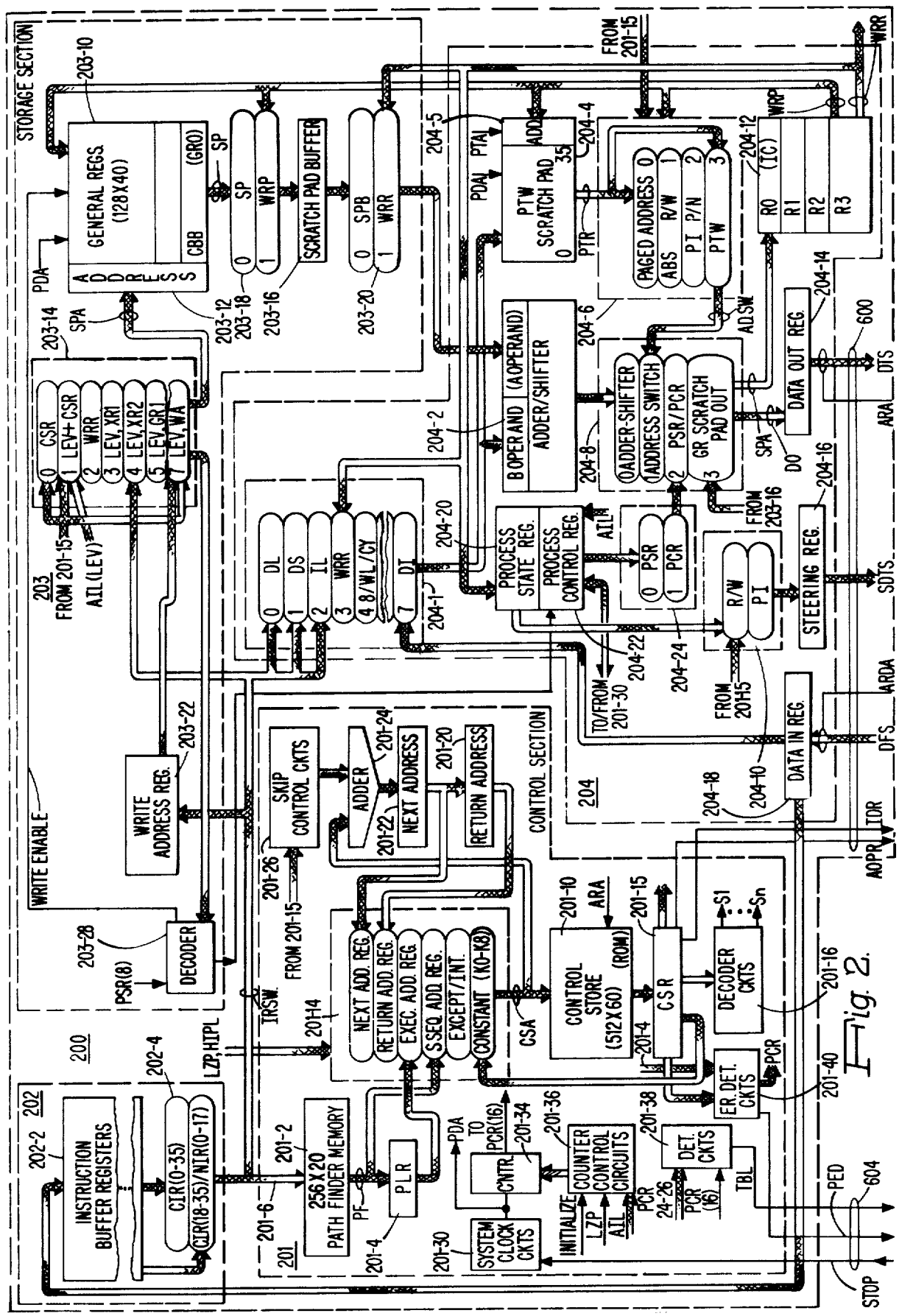
FIG. 2 shows in greater detail an input/output processing unit of a processor pair of FIG. 1.

General Description
The Port Interfaces
Data Interface Lines
Programmable Interface Lines
Interrupt Interface Lines
Local Memory Interface Lines
Error Notification Interface Lines
Detailed Description of Input/Output Processor 200
Control Store Section 201
Instruction Buffer Section 202
Storage Section 203
Processing Section 204
Error Detection Circuits 201-32 - FIG. 2
Counter and Detector Circuits
Control Logic Circuits 201-30

DETAILED DESCRIPTION OF SYSTEM INTERFACE UNIT 100

Interrupt Section 101
Data Transfer Section 102
Control Section 103

DESCRIPTION OF OPERATION

DESCRIPTION OF THE PREFERRED EMBODIMENT

General Description

Figure 1:
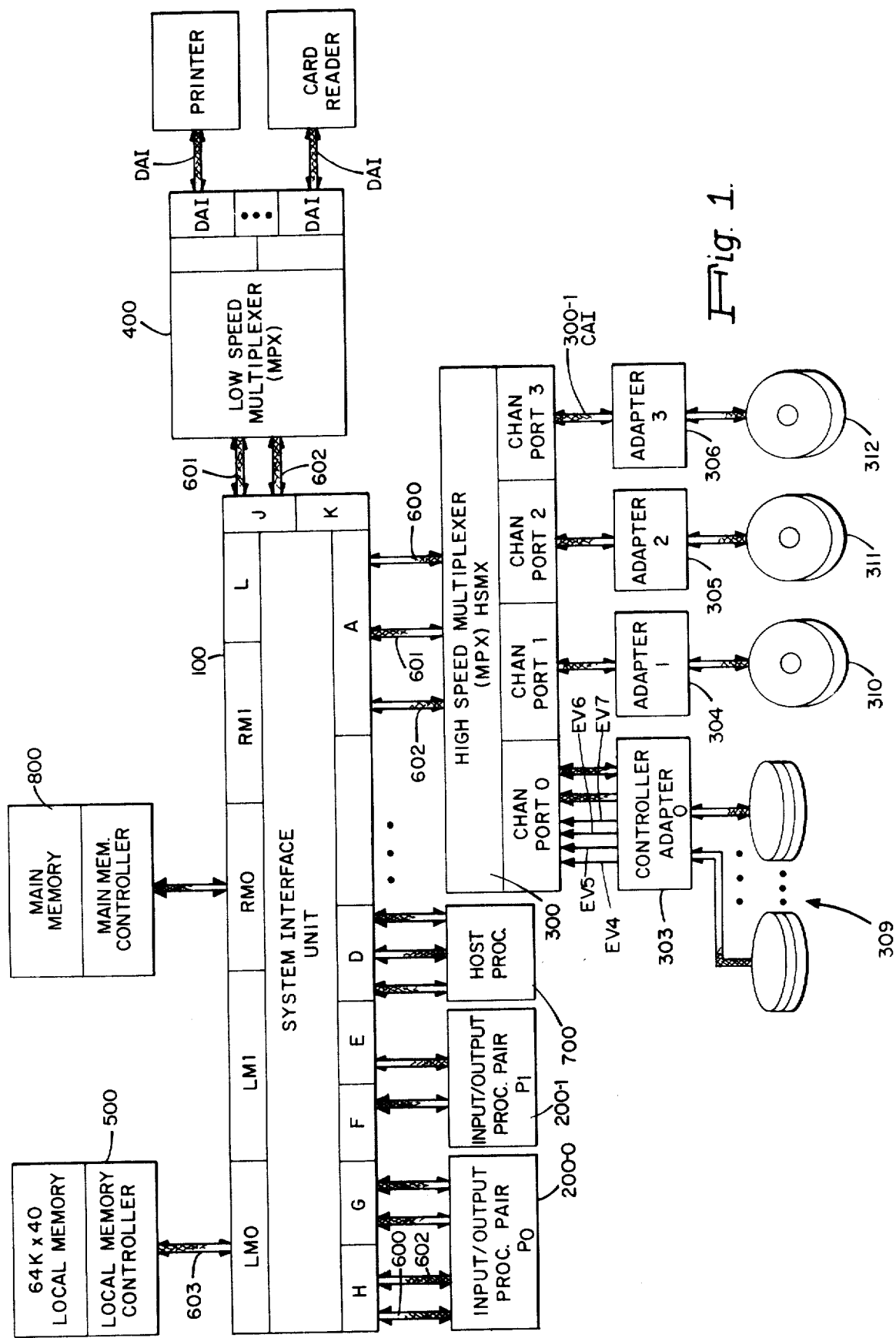
FIG. 1 illustrates in block diagram form an input/output system employing the principles of the present invention.

As seen from FIG. 1, the system which incorporates the principles of the present invention includes two input/output processor (IOPP) pairs 200-0 and 200-1, a system interface unit (SIU) 100, a high speed multiplexer (HSMX) 300, a low speed multiplexer (LSMX) 400, a host processor 700, a local memory module 500, and a main memory module 800. Different ones of these modules connect to one of a number of ports of the system interface unit 100 through a plurality of lines of different ones of different types of interfaces 600 through 603. More specifically, the two input/output processors of logical pair 200-0 and 200-1, the host processor 700, and high speed multiplexer 300 connect to ports G, H, E, F, D, and A, respectively, while the low speed multiplexer 400, memory modules 500 and 800 connect to ports J, LMO, and RMO, respectively.

The input/output system of FIG. 1 can be viewed as including a number of "active modules", "passive modules", and "memory modules." The IOP processor 200, host processor 700, and high speed multiplexer 300 serve as active modules in that each has the ability to issue memory commands. The active modules normally connect to ports A through H. A plurality of passive modules are connected to three ports J, K, and L. These modules correspond to the low speed multiplexer 400 and the system interface unit 100 and are units capable of interpreting and executing commands applied to the lines of interface 601 as described herein. The last group of modules constitutes local memory modules and remote memory modules (not shown) such as those of the main system (not shown) which are capable of executing two different types of commands applied to the lines of interface 603.

The input/output system of FIG. 1 normally functions as an input/output subsystem responsive to input/output instructions issued by host processor 700 which normally connects to port D via the interface 600, 601, and 602 which correspond to a data interface, a programmable interface, and an interrupt interface, respectively, described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiatess and terminates channel programs required for the execution of input/output instructions, processes interrupt requests received from the system interface unit 100 and directly controls unit record peripheral devices coupled to low speed multiplexer 400. The processor pair 200-0 connects to ports G and H via the data interface 600 and interrupt interface 602.

The low speed multiplexer 400 which for the purposes of the present invention can be considered conventional in design, provides for attachment of low speed peripheral devices via peripheral adapters, each of which couples to the lines of a device adapter interface (DAI). The interface and adapter may take the form of those units described in U.S. Pat. No. 3,742,457, which is assigned to the assignee of the present invention. The low speed devices include card readers, card punches, printers, and consoles. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which connects to a maximum of 16 devices, in turn, connects to a different one of the ports or channels 0 through 3 via the interface lines of a channel adapter interface (CAI) 301-1. The high speed multiplexer 300 connects to port A corresponding to a data interface 600, a programmable interface 601, and an interrupt interface 602.

For the purposes of the present invention, each of the channel controller adapters 302 through 305 may be considered conventional in design and take the form of controller adapters described in the aforementioned U.S. Pat. No. 3,742,457.

As mentioned previously, each of the modules connects to different ports of the system interface unit 100. The unit 100 controls the connection of the different modules to each other via transfer paths enabling the transfer of data and control information beween pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determined the relative priority of interrupt requests received from each of the modules and selects the highest priority request received and passes the request to processor 200 via a switching network as explained herein.

THE PORT INTERFACES

Before describing in greater detail different ones of the modules of FIG. 1, each of the interfaces 600 through 603 referred to previously will now be described with reference to FIGS. 5a through 5d.

Figure 5E:
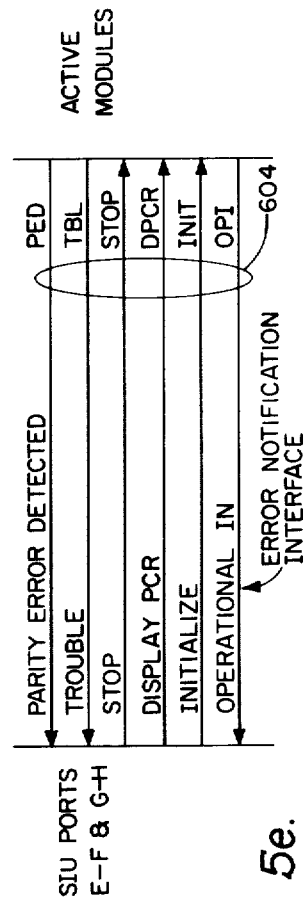
FIG. 5e shows the lines which comprise an error notification interface of FIG. 1.
Figure 5A:
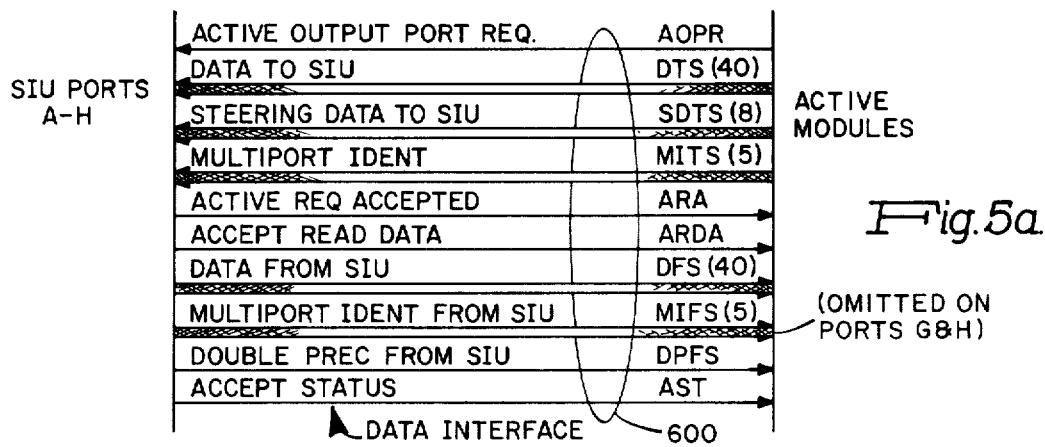
FIG. 5a shows the lines which comprise a data interface of FIG. 1.

Referring first to FIG. 5a, it is seen that this figure discloses the lines which constitute the data interface 50 which is one of the interfaces which provides for exchange of information between an active module and the system interface unit 100. Exchange is accomplished by controlling the logical states of various signal lines in accordance with pre-established rules implemented through a sequence of signals termed "a dialog."

As seen from FIG. 5a, the interface includes an active output port request line (AOPR), a plurality of data to SIU lines (DTS OO-DTS 35, P0-P8), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lins (MIFS 0-3, P), a double precision from SIU line (DPFS), and an accept status line (AST). The description of the interface lines is given in greater detail in the section to follow.

DATA INTERFACE LINES

| designation | Description |
|---|---|
| AOPR | The active output port request line is a unidirectional line which extends from each of the active modules to the SIU 100. When set, this line signals the SIU that the module requests a transfer path over which a command or a command and data is to be transferred. |
| DTS 00-35, P0-P3 | The data to SIU lines are a four byte wide unidirectional path (four 10 bit bytes) that extend between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows:<br>a) The state of bit 0 - The type of command applied to the DTS lines (whether the command is a programmable interface command or a memory command).<br>b) Bits 1-4 are coded to indicate which one of the modules is to receive and interpret the command (memory or ZAC commands are interpreted only by memory modules and programmable interface commands shall be interpreted by all modules except input/output processors 200-0).<br>c) The state of bit 5 indicates whether one or two words of the command information is to be transferred between the requesting active module and the designated receiving module (one word specifies a single precision transfer and two words specifies a double precision transfer).<br>d) The state of bit 6 indicates the direction of transfer between the requesting module and the designated receiver module.<br>e) Bit P is a parity bit generated by the requesting active module which is checked by apparatus included within the SIU 100. |
| MITS 0-3, P | The four multiport identifier to SIU lines extend from the active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The data from SIU lines are another set of data path lines which are a four byte wide unidirectional path (four 10 bit bytes) which extends from the SIU to each active module. This set of lines is used by the SIU 100 to convey read type data to a designated one of the active modules. |
| MIFS 0-3, P | The four multiport identifier from SIU lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS |

| DATA INTERFACE LINES | |
|---|---|
| designation | Description |
| | lines. |

Figure 5B:
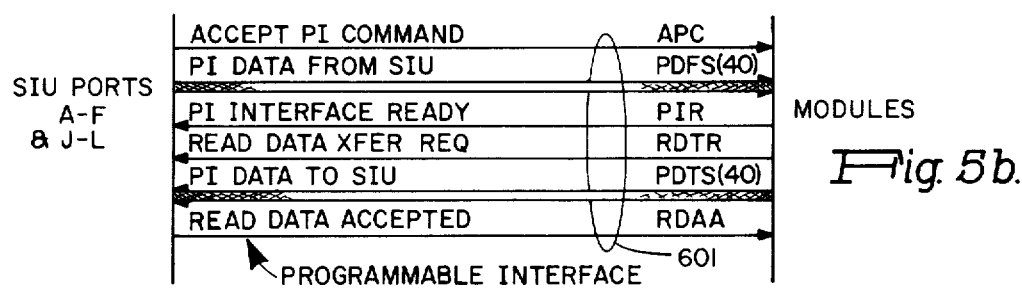
FIG. 5b shows the lines which comprise programmable interfaces employed in the system of FIG. 1.

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog." The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extends from the SIU 100 to each module. These lines apply programmable interface information from the system interface unit to a designated receiving module. |
| PIR | The programmable interface ready line extends from each module to the SIU. When set or high, this line indicates that the module is ready to accept a command to be applied to line PDFS. |
| PDTS 00-35 P0-P3 | The programmable interface data to the SIU lines are a four byte wide unidirectional path (four 10 bit bytes) that extend from each module to the SIU 100. These lines are used to transfer programmable interface information to the SIU. |
| RDTR | The read data transfer request line extends from each module connected to the programmable interface to the SIU 100. When set or high, this line indicates that the previously requested read data is available for transfer to a module and has been applied to the lines PDTS by the module. |
| RDAA | The read data accepted line extends from the SIU 100 to each module. When set or high, the line indicates to the module that the data applied to the lines PDTS has been accepted and that the module may remove the information from these lines. |

Figure 5C:
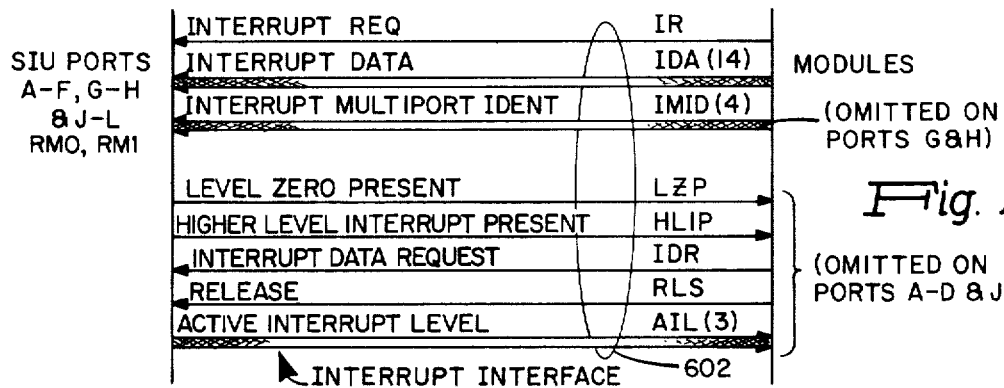
FIG. 5c discloses lines which comprise the interrupt interfaces included within the system of FIG. 1.

A further interface is the interrupt interface 602 of FIG. 5c which provides for interrupt processing by the input/output processor pairs 200-0 and 200-1. That is, the interface enables the transfer of interrupt information by a module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog."

The interface includes an interrupt request line (IR), a plurality of interrupt data lines (IDA 00-11, P0-P1), and a plurality of interrupt multiport identifier lines (IMID 00-03) for modules connected to ports A through L. For modules connected to ports G and H, the interrupt interface further includes a level zero present line (LZP), a higher level interrupt present line (HLIP), an interrupt data request line (IDR), a release line (RLS), and a plurality of active interrupt level lines (AIL0-2). As seen from FIG. 5c, the interrupt interface ports G and H do not include an interrupt multiport identifier line. The description of the interrupt lines is given in greater detail herein.

| INTERRUPT INTERFACE LINES | |
|---|---|
| Designation | Description |
| IR | The interrupt request line extends from each module to the SIU 100. When set or high, this line indicates to the SIU that it requires service. |
| IDA 0-3, P0 IDA 4-11, P1 | The interrupt data lines extend from a module to the SIU 100. These lines are coded to contain control information required to be transferred to the input/output processor. These bits are coded as follows: <br> a) The state of bit 0 specifies to the SIU 100 which of the two processors (i.e., processor number) is to process the interrupt request. <br> b) Bits 1-3 are coded to indicate the priority or level number of the interrupt request to the SIU 100. <br> c) Bit P0 is a parity bit for bits 0-3. <br> d) Bits 4-8 are coded to provide a portion of an address required to be generated by an input/output processor for referencing the correct procedure for processing the interrupt (i.e., an interrupt control block number ICBN). <br> e) Bit P1 is a parity bit for bits 4-11. |
| IMID00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor. When set or high, this line indicates that there is a highest priority (level 0 interrupt) request being directed to a processor by the SIU 100. |
| HLIP | The higher level interrupt present line extends from the SIU to each input/output processor. When set or high, this line indicates that there is an interrupt request having a higher level or priority than the procedure or process being executed by the processor. |
| IDR | The interrupt data request line extends from the input/output processor to the SIU 100. When set or high, this line indicates that interrupt data is to be sent to the processor on lines DFS by the SIU 100. |
| RLS | The release line extends from each input/output processor to the SIU 100. This line, when set or high, indicates that the processor has completed execution of the current procedure. |
| AIL 0-2 | The active interrupt level lines extend from the SIU to the input/output processor. These lines are coded to designate the interrupt level number of the procedure being executed by the processor. |

Figure 5D:
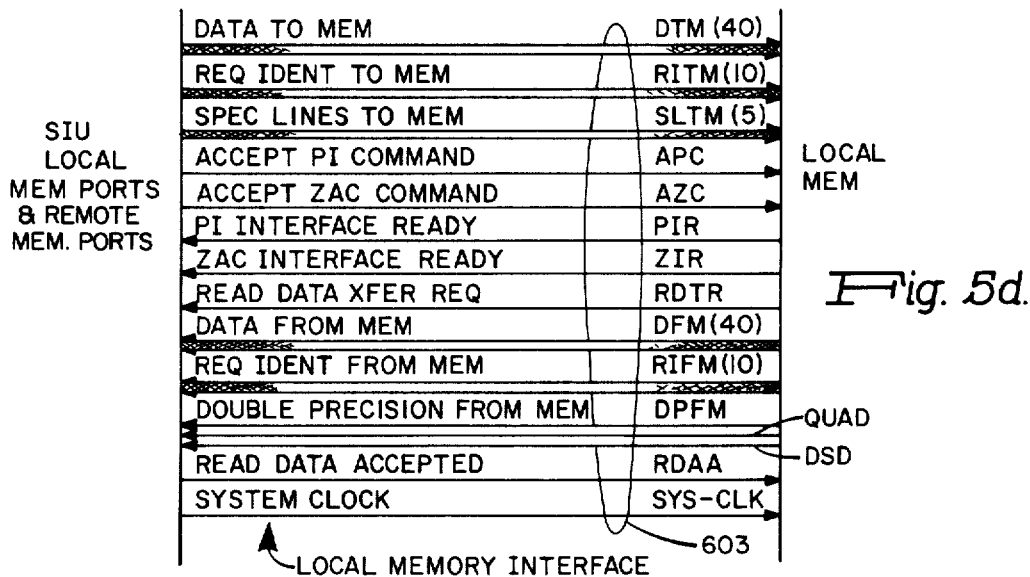
FIG. 5d shows the lines which comprise a local memory interface of FIG. 1.
Figure 9:
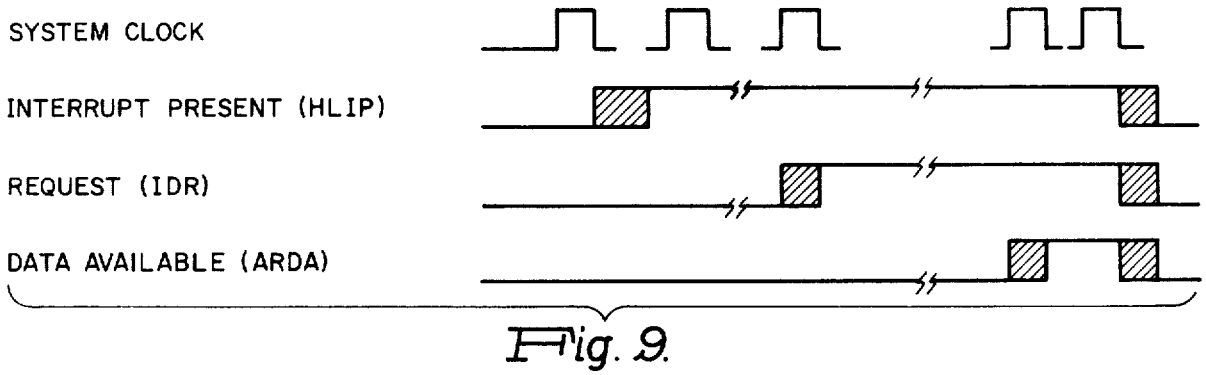
FIG. 9 illustrates the signal sequence for processing an interrupt.

A further set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specifiction lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3), a plurality of request identifier from memory lines (RIFM 0-7, P0-P1), a double precision from memory line (DPFM, a QUAD line, a read data accepted line (RDAA) and a system clock line (SYS-CLK). A similar interface is used for connecting the main memory module 800 to the SIU 100.

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines is given in greater detail herein.

LOCAL MEMORY INTERFACE LINES

| Designation | Description |
|---|---|
| DTM 00-35 P0-P3 | The data path lines constitute a four byte wide unidirectional path (36 information lines and four odd parity lines) that extends from the SIU 100 to the local memory 500. These lines are used to transfer memory or programmable interface commands and data to the local memory 500. |
| RITM 0-3, P0 RITM 4-7, P1 | The requestor identifier to memory lines constitutes two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows.<br>a) Bits 0-1 are port number selection bits coded to specify which port or subchannel within the attached module is to receive or interpret the memory command sent to the module.<br>b) Bit 2 is a read/write to memory bit which is included in the steering control information received from the active module which is forwarded by the SIU to the local memory 500 when a new command is sent to the memory by the SIU 100. The state of this bit indicates the direction of data transfer.<br>c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set or high, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set or high, this line indicates that the command information applied to the lines DTM is to be accepted by the local memory module 500. |
| PIR/ ZIR | The programmable interface ready line and ZAC interface ready line extends from the local memory module 500 to the SIU 100. When set or high, each line signals the SIU 100 that the local memory module 500 is capable of accepting a programmable interface (PI) or memory (ZAC) command. |

LOCAL MEMORY INTERFACE LINES -continued

| Designation | Description |
|---|---|
| RDTR | The read data transfer request line extends from the local memory module 500 to the SIU 100. This line, when set or high, indicates that the read type data previously requested by a ZAC or PI command is available along with the necessary control information to be sent to the module requesting the data. |
| DFM 00-35 P2-P3 | The data from memory lines are a four byte wide unidirectional bus which extends from the local memory module 500 to the SIU 100. These lines are used to return read requested type data to an active module via the SIU 100. |
| RIFM 0-3, P0, RIFM 4-7, P1 | The two groups of requestor identifier from memory lines extend from the local memory module 500 to the SIU 100. These lines are coded for directing the read data from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows<br>QUAD DPFM<br>0 0 one word single precison<br>0 1 two words, double precision<br>1 X (don't care) four words |
| DSD | The read data/status identifier line extends from the local memory module 500 to the SIU. The state of this line signals the SIU 100 whether the information applied to the lines DFM is read data or status information when line RDTR is set to a binary ONE. When set, the line information of one or two words (QUAD=0) is being transfered. When reset to a binary ZERO, the line signals that up to four words of data are being transferred, the number being specified by the coding of lines QUAD and DPFM. |
| RDAA | The read data accepted line, as mentioned in connection with the programmable interface, extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor to synchronize the operations of each memory module from a common system clock source. |

A last set of interface lines is shown in FIG. 5e. In accordance with the present invention, several of these lines signal certain conditions as for example error conditions and operational conditions. More importantly, these lines enable the SIU 100 to control the operation of the processor pair in accordance with the present invention.

As seen from FIG. 5e, the interface includes a display PCR line (DPCR), a parity error detected line (PED), a trouble line (TBL), a STOP line, an initialize line (INIT), and an operational in line (OPI). The description of the interface lines is given herein in greater detail.

ERROR NOTIFICATION INTERFACE LINES

| Designation | Description |
|---|---|
| DPCR | The display process control register (DPCR) line is a line from the SIU 100 to the attached input/output processor whose state indicates that the contents of the PCR register of the input/output processor should be gated onto the data lines to the SIU 100. This line is |

-continued

| ERROR NOTIFICATION INTERFACE LINES | |
|---|---|
| Designation | Description |
| | activated in response to a WREX instruction to SIU 100 and deactivated in response to any RDEX instruction directed to SIU 100. |
| PED | The parity error detected line is a single line which is coded to indicate to the SIU 100 the logical "OR" of all the parity error detector circuits internal to the attached I/O processor. This line is used by the SIU 100 as an indication that a level zero interrupt is to be issued to the processor. |
| TBL | The trouble line, when set by the processor, notifies the SIU 100 that it has encountered an exception condition while in level zero or a time-out during the self test. |
| STOP | A line from the SIU 100 to a module which, when set, indicates that the module should cease all activity. |
| INIT | A line from SIU 100 to a module which, when set, causes the module to assume the initialized state. |
| OPI | A set/complement pair of lines to the SIU 100 from a module. The pair is coded to indicate when the module is active, is powered up, and is ready to generate or accept commands. |

Having described the different types of interfaces utilized by the modules of FIG. 1, each of the modules pertinent to the understanding of the present invention will now be described in greater detail.

DETAILED DESCRIPTION OF INPUT/OUTPUT PROCESSOR 200

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic logic logice operations under the control of microprograms stored in control store 201-10.

CONTROL STORE SECTION 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microninstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand output, address signals from one of the sources selected by switch 201-14 and as the other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indictive of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 2, required for establishing appropriate memory cycles of operation for control section as well as timing signals for operating other sections of processor 200 and the other modules of the system of FIG. 1 are provided by clock circuits included within a block 201-30. The clock circuits receive as an input the STOP line which, when in a binary ONE state, inhibits further operation of control section 201. The block 201-30 includes circuits for signalling the SIU 100 via the OPI line that the processor 200 is operational. For the purposes of the present invention, the clock circuits as well as the other circuits of FIG. 2 can be considered conventional in design and can, for example, take the form of circuits disclosed in the publication titled "The Integrated Circuits Catalog for Design Engineers", by Texas Instruments Inc., printed 1972. More specifically the clock circuits can comprise a crystal controlled oscillator and counter circuits while the switch 201-14 can comprise a plurality of data selector/multiplexer circuits.

From the above, it is seen that, as in most microprogram-controlled machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al., which is assigned to the assignee of the present invention. Reference may also be made to other ones of the documents referenced in the introductory portion of the specification.

INSTRUCTION BUFFER SECTION 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

STORAGE SECTION 203

As seen from FIG. 2, this section comprises a scratch pad memory containing eight sets or groups or registers associated with eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9-12 or bits 14-17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GRO) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) - 16 (ECB # + 1). Each ECB includes values for loading the PSR, IC, and PTBR registers in addition to a saving area pointer in ECB#0 which points to a stack area for storing information pertinent to the current process before the processor 200 enters the exception routine.

The address of an interrupt control block (ICB) equals the control block base (CBB) + (ICB#). The ICB# is obtained from the interrupt word as explained herein. Similarly, the ICB is a for word block and it contains values for the PSR, IC, GR14, and PTBR registers.

PROCESSING SECTION 204

This section performs all of the arithmetic and logic operations required to process program instructions. The section 204 includes an adder/shifter unit 204-1 capable of performing arithmetic, shift, and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purpose of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output busses WRP and WRR. The WRP bus connects to address inputs 204-5, to switch 203-18 and to scratch pad memory 203-10. The WRR bus connects to A operand switch 203-20, to B operand switch 204-1, to connection 204-20 and to register 204-22. The registers selected for connectin to the WRR and WRP buses are designated by a pair of fields included within the microinstruction read out to register 201-15.

As seen from FIG. 2, the processing section 204 includes process state register 204-20 and a process control register 204-22. The process state register 204-20, as mentioned, is loaded from scratch pad memory 203-10 via output bus WRR. The process control rgister 204-22 is a 36 bit register common to all eight interrupt levels.

The bit positions of the process control register 204-22 contain the following information. Bit positions 0-8 designate different types of exceptions which include the following.

| PCR BIT POSITION | EXCEPTION TYPE |
|---|---|
| 0 | Operation not complete; no response from SIU on lines ARA or ARDA. |
| 1 | Page address bounds fault (key check). |
| 2 | Page access fault. |
| 3 | Page not resident in memory. |
| 4 | Illegal operation (invalid instruction, illegal slave instruction, or illegal slave operation). |
| 5 | Process timer run out. |
| 6 | Overflow. |
| 7 | Lockup fault. |
| 8 | Address misalignment. |

The term "fault" does not necessarily mean the occurrence of a hardward failure, but includes programming errors, etc.

Bit positions 9-12 store the parity errors detected per data path substrate. Bit position 13 indicates when a parity error is detected in the Data In register. Bit positions 14-15 store indications of parity errors detected per control store and pathfinder memory. Bit 15 signals no response to the level zero interrupt present. Bit positions 23-26 identify the processor number and level received from the PNID and AIL lines. Bit position 27 is an interrupt inhibit bit position while bit positions 28-35 store interrupt request bits which, when set to a binary ONE, indicate an interrupt request to a level correspondng to the bit position (i.e., bit 28 = level 0). The bit positions 27-35 are loaded by program instruction from the bank of registers of block 204-12 via output bus WRR. Bit position 35 is always set to a binary ONE.

The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a for position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bis WRP.

In the case of a PI command, the steering information is generated as follows: bit 0 is forced to a binary ONE for a PI command; bits 1-4 correspond to bits 0-3 of register 204-20; and bits 5-6 correspond to bits of one of the fields of the microinstructions which are coded to designate whether it is a single or double word transfer and whether it is a read or write cycle of operation. Upon the start of a memory cycle or initiation of a command, the signals from the steering switch 204-10 are loaded into a steering register 204-16 which applied the signals to the appropriate lines of the data interface 600 of processor 200. As explained therein, the command including additional steering information is provided by position 2 of address switch 204-6 in the case of a PI command.

As also seen from FIG. 2, processing section 204 includes a scratch pad, memory 204-4 addressable via address inputs 204-5 which receives address signals from one of the registers connected to the WRP bus. The scratch pad memory 204-4 provides page table word storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selected switch 204-6 are used to provide the memory or PI command. More specifically, positions 0 and 1 of address switch 204-6, when selected by an address control field of a microinstruction word stored in register 201-15, generates the R/W memory command information which includes bits 0-8 coded in accordance with predetermined fields of the microinstruction word and bits 9-35 coded to correspond to either paged address information from memory 204-4 (position 0) or absolute address bits applied to output bus WRP by the working registers of block 204-12 (position 1). When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or sub-channel within the module, bit 3 is coded to specify the processor pair number supplied by the SIU 100, bit 4 is a ZERO and bits 9-35 equal bits 9-35 of bus WRP which correspond to the absolute address of the PI command.

ERROR DETECTION CIRCUITS 201-32 - FIG. 2

In addition to the above described circuits, each IOP processor includes error detection circuits conventional in design, such as parity check circuits, which perform checks on the various storage sections of each input-/output processor as explained herein. The block 201-32 also supplies signals to the various lines of interface 604 as explained herein.

Although shown as a single block, it will be appreciated that the parity generation and check circuits are located at various points throughout the processor 200. For example, the four parity bits for data stored in general register locations of scratch pad 203-10 are generated by circuits connected to the input bus to the scratch pad 203-10. Parity circuits connected to SPB register output check the output signals for correct parity. Similarly, parity generation circuits generate parity for signals at the output of B operand switch 204-1 to be written into the PTW scratch pad 204-4. The parity of each byte read out from PTW scratch pad 204-4 is checked by parity check circuits located at the input to address switch 204-6.

Additionally, the control store 201-10 and pathfinder memory 201-2 include parity check circuits for detecting the presence of single bit failures in memory locations. The occurrence of an error sets the corresponding control store bit (i.e., bit positions 14-15) of PCR register 204-22. Further, parity circuits connected to the Data In register 204-18 check all data and instructions clocked into the Data In register 204-18. A parity error detected on data from the SIU 100 sets the corresponding substrate parity error bit (i.e., bit positions 9-12) for the bad byte and Data In bit position 13 of PCR register 204-22.

The block 201-32 includes OR logic circuits which are connected to receive signal indications of the parity error bits stored in PCR register 204-22. One group of these circuits provides a resultant signal to line PED which corresponds to the logical OR of the parity error signals.

COUNTER AND DETECTOR CIRCUITS

Another group of circuits includes the circuits of blocks 201-34, 201-36, and 201-38. Block 201-34 includes a nine stage counter, conventional in design, controlled by the circuits of block 201-36. The counter serves as a "level zero" timer which detects when processor 200 does not respond to an interrupt request within a period equal to twice the operation-not-complete time interval.

In greater detail, the counter is initialized to a zero state by the circuits of block 201-36 as long as the LZP line remains at a binary ZERO. When the LZP line switches to a binary ONE, the circuits of block 201-36 remove the initialize signal and the counter starts running or increases its count by one in response to each PDA signal from the circuits of block 201-30. When it reaches a maximum count (all binary ONES) and the AIL lines still have not been switched to a ZERO state, the counter generates an output which forces bit position 16 of the PCR register 204-22 to a binary ONE.

The incrementing of the counter of block 201-34 is stopped by the circuits of block 201-36 when either the AIL lines are switched to ZERO or the LZP line is switched to ZERO by SIU 100. The signals also initialize the counter. Lastly, the circuits 201-36 apply the signals on the INIT line as an input to switch 201-14. When the SIU 100 forces the INIT line to a binary ONE, this initializes or clears the contents of the various registers within the processor 200 (i.e., PCR register 204-22). When reset, the processor 200 begins executation of an initialization routine in control store 201-10.

The circuits of block 201-38 include several OR and AND gates. These circuits are used to force the TBL line to a binary ONE. The TBL line is forced on which bit position 16 of the PCR register 204-22 has been set as a result of a "time out" prior to the SIU switching of the processor 200 into level zero. That is, signals corresponding to bit position 16 and the level bit positions 24-26 are "ANDed" such that the TBL line is switched on when bit position 16 is a binary ONE and the PCR bits indicate that the processor is not in level zero. Another group of circuits provide a logical OR of the exception bit signals stored in PCR register 204-22 (i.e., bit positions 0-8). The output is then ANDed with the level bits 24-26 of the PCR register 204-22. Thus, when the processor has been switched to level 0, any one of the exception signals forces the TBl line to a binary ONE. However, prior to the processor 200 being switched to level zero, exception signals are inhibited from switching the TBL line to a binary ONE. The reason for this is that during an initial self test operation, the time that an error occurs there could already be an exception signal stored in the PCR register 204-22 and it is desirable that this not be detected as a trouble indication. That is, a specific test (self test) is used to establish trouble indications, as explained herein.

CONTROL LOGIC CIRCUITS 201-30

Figure 2A:
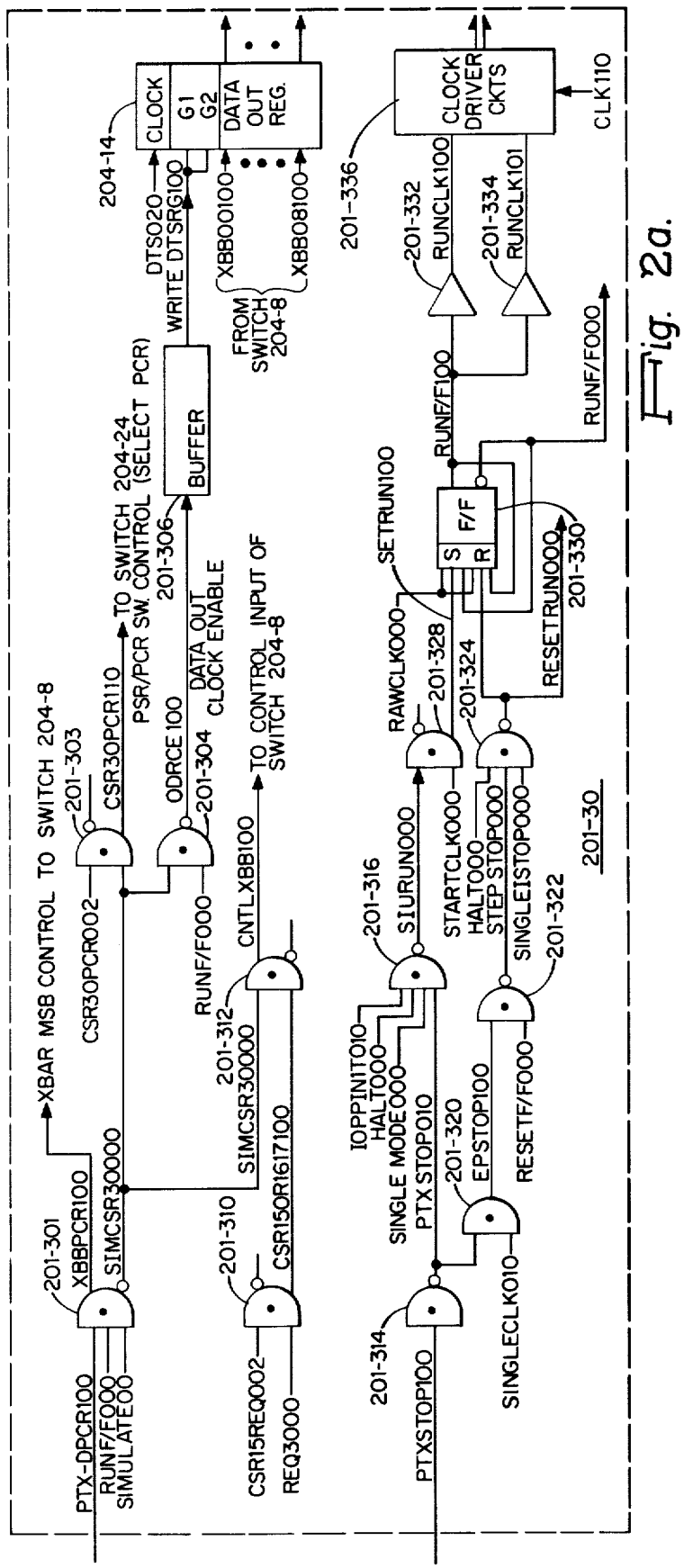
FIG. 2a illustrates in greater detail portions of the circuits of FIG. 2 in accordance with the present invention.

FIG. 2a illustrates in greater detail those circuits of block 201-30 of FIG. 2 which condition processor 200 to display the contents of process control register 204-22 in accordance with the present invention.

Referring to FIG. 2a, it is seen that as NAND/AND gate 201-301 receives as inputs, the signal PTXDPCR100 from the DPCR line, the binary ZERO output from a run flip-flop 201-330 and a simulate 00 signal from test circuits, not shown. It can be assumed that signal SIMULATE 00 is a binary ONE.

The AND output signal SBBPCR100 is applied as an input to switch 204-8 This signal establishes the state of the most significant bit of the control signals applied to switch 204-8. The NAND output signal SIM CSR30000 is applied as an input to a pair of NAND/AND gates 201-303 and 201-304. The gate 201-303 also receives signal CSR30 PCR002 from register 201-15. The output signal CS 30PCR110 is applied as an input to PSR/PCR switch 204-24 and establishes which position of the switch is to be selected a an input to switch 204-8.

The gate 201-304 receives the binary ZERO output of the RUN flip-flop 201-330 which it combines with signal SIM CSR30000 to produce a data out clock enable signal ODRCE100. This signal is applied via a gate buffer circuit 201-306 to the gate input of data out register 204-14. It will be appreciated that the data out register 201-14 receives a clocking signal DTS020 from a free running clock circuit, not shown. However, it is the state of the control signal WRITE DTSRG100 which establishes when data signals are to be clocked or loaded into the register.

Another pair of NAND/AND gates 201-310 and 201-312 combine signal SIM CSR3000 with control signal CSR15REQ002 from register 201-15 and request signal REQ3000 from SIU 100 to produce control signal CNTLXBB100. This signal is applied to switch 204-8 and establishes whether the PSR/PCR position is to be selected.

A last group of NAND/AND gates 201-314 through 201-324 receive signal PTXSTOP100 from line STOP. When the processor 200 is not in a single cycle mode (i.e., signal SINGLEMODE000 = 1), gate 201-320 switches signal EPSTOP100 to a binary ZERO. This in turn causes gate 201-324 to force signal RESETRUN000 to a binary ZERO which resets the run flip-flop 201-330 to a binary ZERO. This causes the system clock to stop. That is, it prevents distribution of clock pulse signals via driver circuits 201-332 and 201-334 to the various logic circuits and registers within processor 200.

The run flip-flop 201-330 is switched to a binary ONE via a NAND/AND gate 201-328 in response to signals SIURUN00 and STARTCLK000. The flip-flop 201-330 is a clocked D type flip-flop having set and reset enable inputs as shown. The input section includes a pair of AND gates whose outputs connect in a "wired OR."

DETAILED DESCRIPTION OF SYSTEM INTERFACE UNIT 100

Interrupt Section 101

Figure 3A:
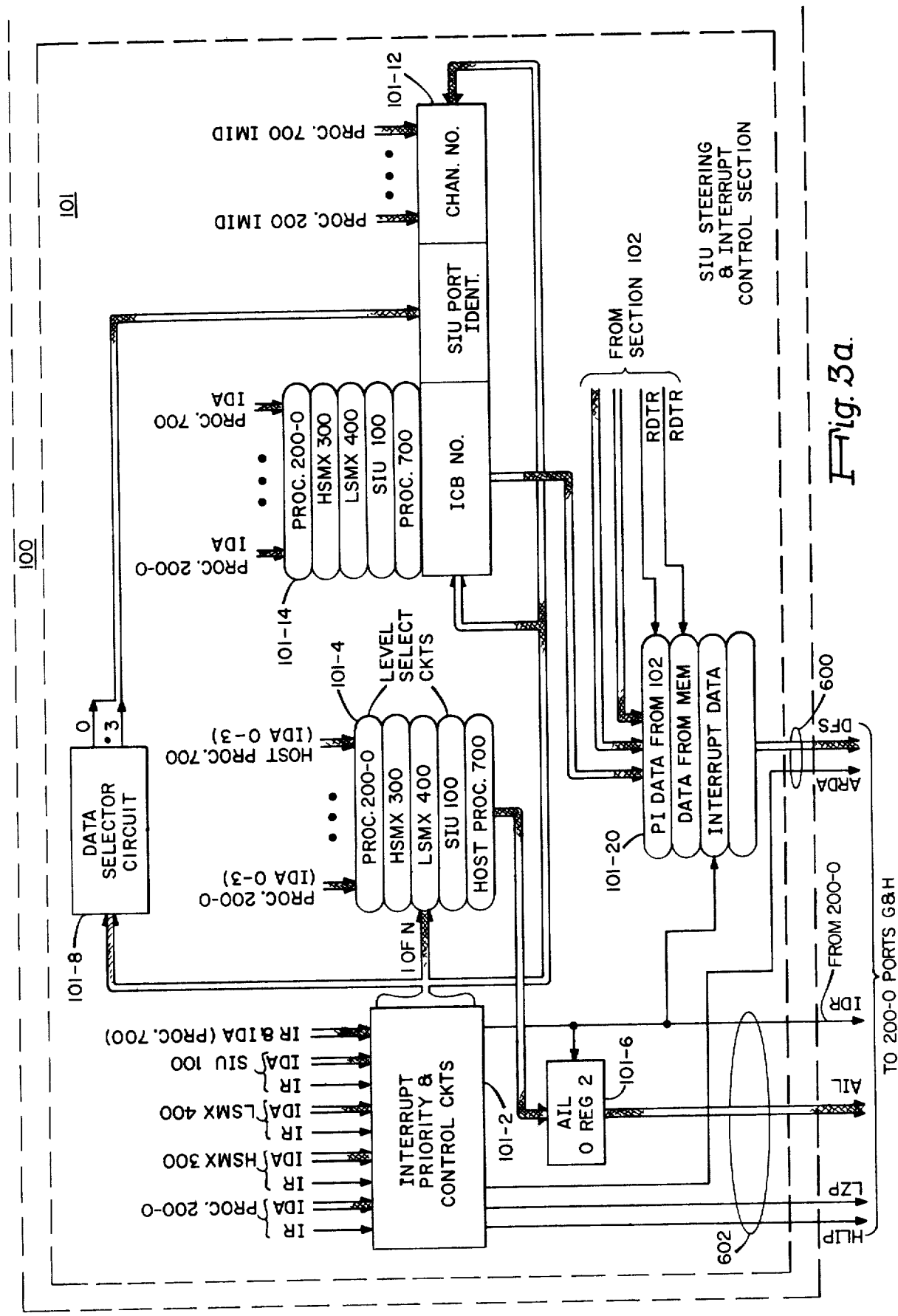
FIGS. 3a through 3c show in greater detail the system interface unit 100 of FIG. 1.

The System Interface Unit 100, as mentioned, provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G, and J, each of which applies signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor pair 200-0 referred to herein as processor 200 when there is a request having a priority higher than that of the process being executed. When processor 200 signals that it is able to accept the request, the SIU 100 gates the identifier information associated with the highest priority request to the processor. The identifier information includes an eight bit interrupt control block number including a parity bit, a three bit interrupt level number and a one bit processor number was a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K.

This means that in the system of FIG. 1 the port of the current process has the highest priority followed by the SIU 100, the high speed multiplexer 300, the host processor 700, the processor 200, and the low speed multiplexer 400.

The priority circuits of block 101-2 are operative to generate an output signal on one of n number of output lines, n corresponds to the number of interrupting modules within the system. The n output lines are applied to an eight position; data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generatd for identifying the modules of FIG. 1.

| CODE | SIU PORT (MODULE) IDENTIFIED |
|------|------------------------------|
| 0000 | Local memory module - port LMO |
| 0001 | port K |
| 0010 | SIU 100 - port L |
| 0101 | Low speed multiplexer 400 - port J |
| 0110 | processor 200 - port G |
| 1101 | high speed multiplexer 300 - port A |

-continued

| CODE | SIU PORT (MODULE) IDENTIFIED |
|------|------------------------------|
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

DATA TRANSFER SECTION 102

Figure 3B:
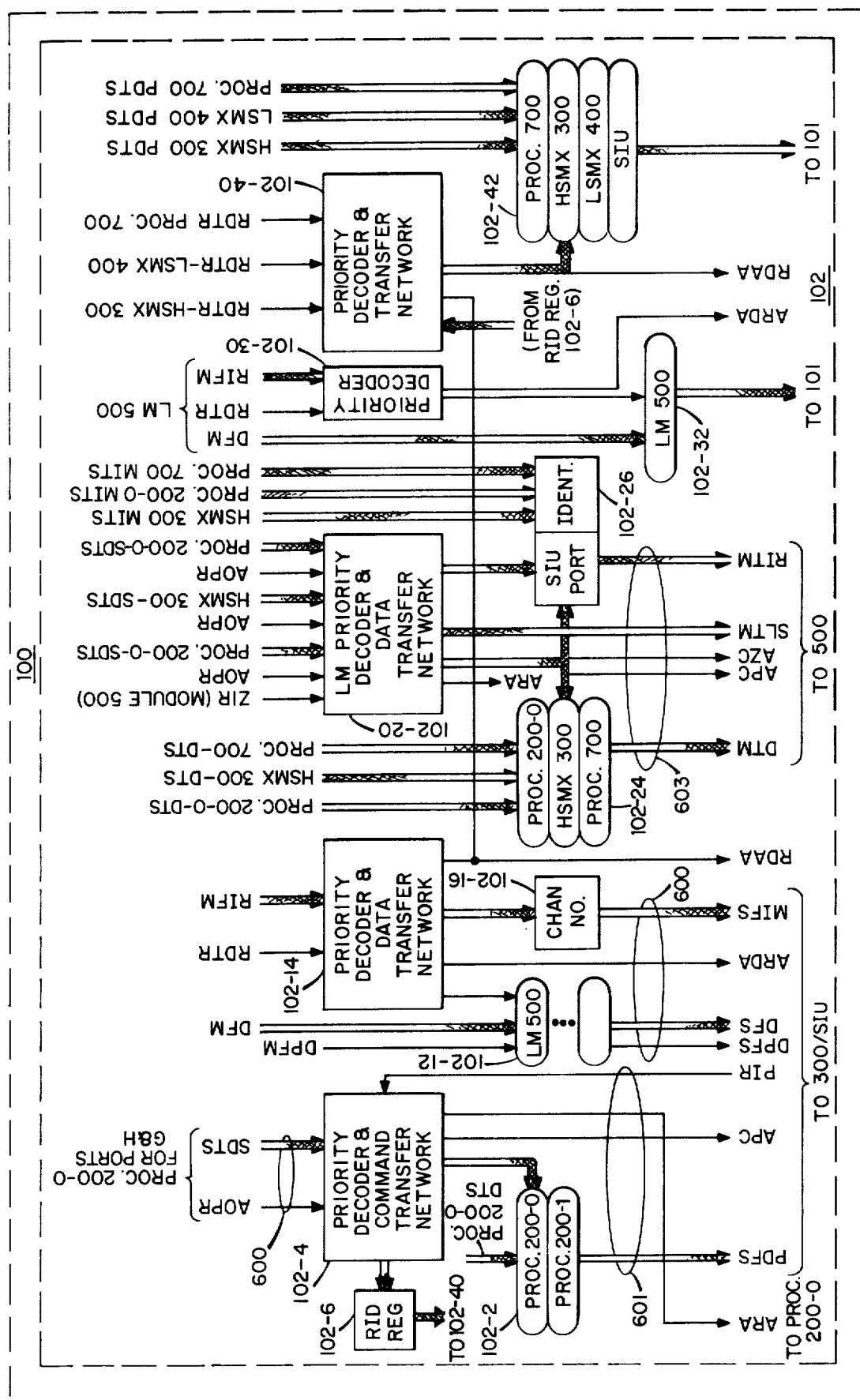

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuit of block 102-4 is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desires to transfer commands to the multiplexer 300. In the case of more than I/O I/P processor when more than one module desires to transfer during the same cycle, a priority network included in network 102-2 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) fowarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted by memory module 500.

An arrangement similar to network 102-14 is used by SIU 100 to transfer PI and memory commands from any one of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700, and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data processor 200. These signals are in turn applied to the processor's DFS lines via selector switch 101-20 of FIG. 3a which is conditioned by the module request signal. During a next cycle of operation, the network 102-40 forces the RDAA line to a binary ONE signalling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

CONTROL SECTION 103

Figure 3C:
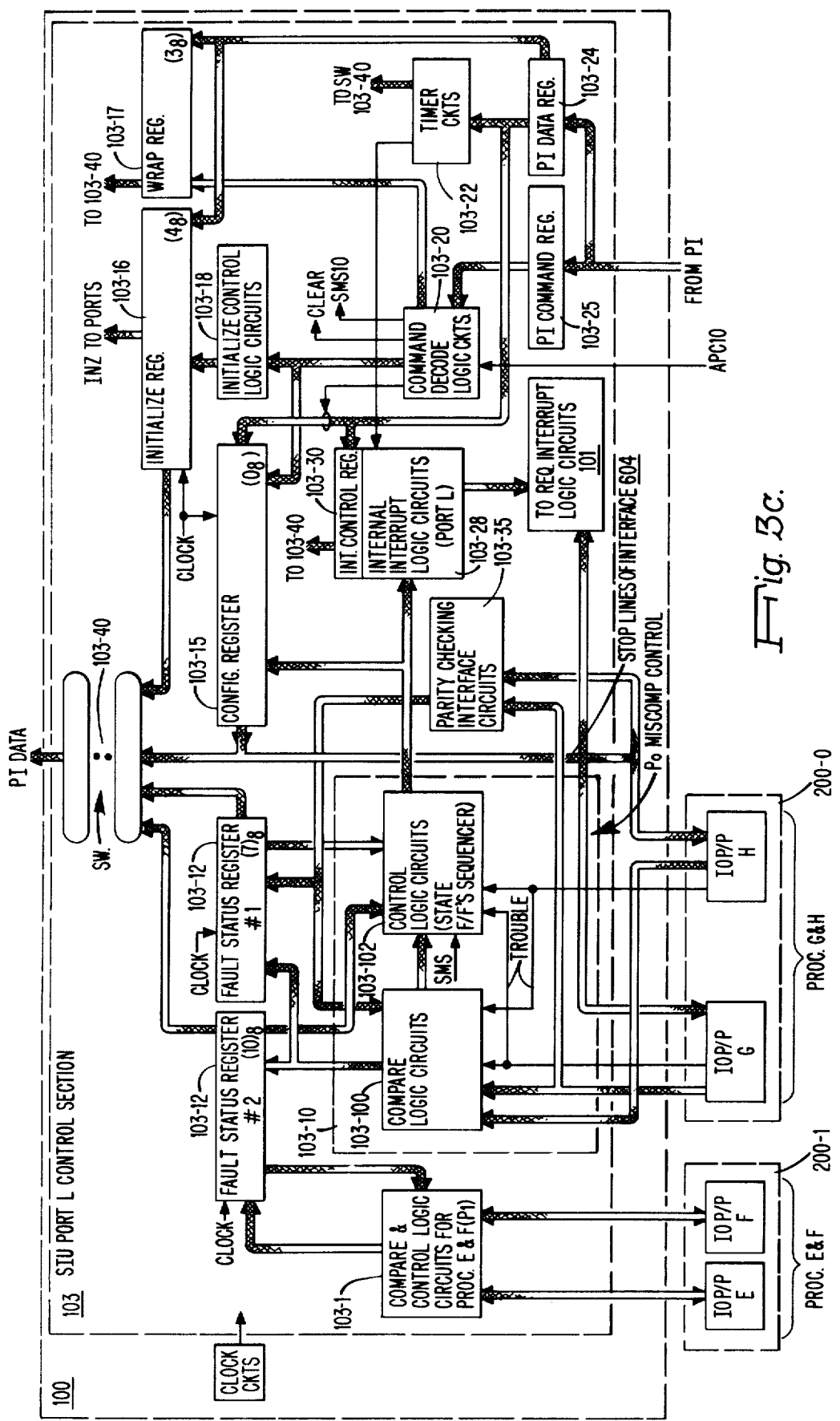

FIG. 3c shows in block diagram form section 103 of the system interface unit 100. This section includes compare and control logic circuits 103-10 and 103-11 for logical processor pairs 200-0 and 200-1. Since these circuits are duplicated for each processor pair, only one is shown in detail herein (i.e., FIG. 3d). Also included are the circuits of blocks 103-20, 103-24, and 103-25 which connect to a PI interface 603 and interpret and execute PI commands directed to the SIU internal logic circuits through port L.

As seen from FIG. 3c, the internal logic circuits in addition to the circuits which process PI commands include an internal interrupt control register 103-30 which feeds internal interrupt logic circuits 103-28. These circuits in construction are similar to the priority interrupt logic circuits 101 shown in FIG. 3a. The internal interrupt logic circuits 103-28 generate eight types of interrupts. The interrupt types pertinent to the present invention are as follows:

1 = interval timer exhaust generated by the interval timer counting through zero;
4 = processor error, detected with no mis-compare;
5 = mis-compare error detected along with a processor error; and,
6 = mis-compare error with no other errors existing.

The interrupt priority within port L is based on type number and the priority is as follows:

| Type | |
|---|---|
| 4 | —highest |
| 5 | |
| 6 | |
| 7 | |
| 0 | |
| 1 | |
| 2 | |
| 3 | —lowest |

The interrupt types 4-7 are hardwired to level 0 while the interrupt levels for other types (i.e., 0, 1, 2, and 3) are programmable using the coded level signals stored in interrupt control register 103-30. The circuits 103-28 establish the interrupt having the highest priority and generate appropriate request signals which are applied to the interrupt logic circuits 101. The format of the request is shown in FIG. 12. As mentioned, the circuits 101 report the interrupts to the designated input/output processor pair.

The SIU internal logic circuits, in response to an RDEX instruction to port L, enable the contents of different ones of the registers 103-12 through 103-17, register 103-30, and timer 103-40 to be read via a multiposition selection switch 103-40. The configuration register 103-15, assigned octal address 0, stores identifier information and the operational status of all SIU ports. It is formatted as shown in FIG. 8a. The interval timer 103-40 which, for the purpose of the present invention, can be considered conventional in design includes a 24 bit register assigned octal address 2 for storing a count defining a particular time interval. The wraparound register 103-17, assigned octal address 3, is a working register used by test and diagnostic routines.

The initialize register 103-16, assigned octal address 4, stores indications for selectively initializing and masking SIU ports. Initializing takes place in response to signals generated by initialize control logic circuits of block 103-18. That is, the register 103-16 is loaded via a WREX instruction and the initialize bit positions are reset by the circuits 103-18, as explained herein. The masking operations take place in a similar fashion and are not pertinent to the present invention. The format of the register is shown in FIG. 8b.

The fault status registers 103-12 and 103-14 are assigned octal addresses 10 and 7, respectively. Fault status register #1 is a 36 bit register used to signal all errors detected by SIU 100 with the exception of processor or memory reported errors. The storage of information relating to an error condition "locks" the register to the first detected error until it is cleared via an RDEX instruction (PI command). It is formatted as shown in FIG. 8c. Fault status register #2 is also a 36 bit register used to signal all processor miscompare errors and any other faults not stored in fault status register #1. It is formatted as shown in FIG. 8d.

As seen from FIG. 3c, section 103 also includes parity generation and checking circuits of block 103-35. These circuits, for the purpose of the present invention, may be considered conventional in design. They generate parity check bits for the signals applied to different processor interfaces by each processor and check them against the parity check bit signals furnished by the processor pairs. The results of the partiy check are applied as inputs to the compare and control logic circuits associated with the processor pair. Although not shown, the parity circuits 103-35 also receive signals from the processor pair 200-1 and furnish result signals to the circuits 103-11.

For further detailed information regarding FIG. 3c, reference may be made to the copending application "Input/Output Processing System Utilizing Locked Processors."

Figure 4:
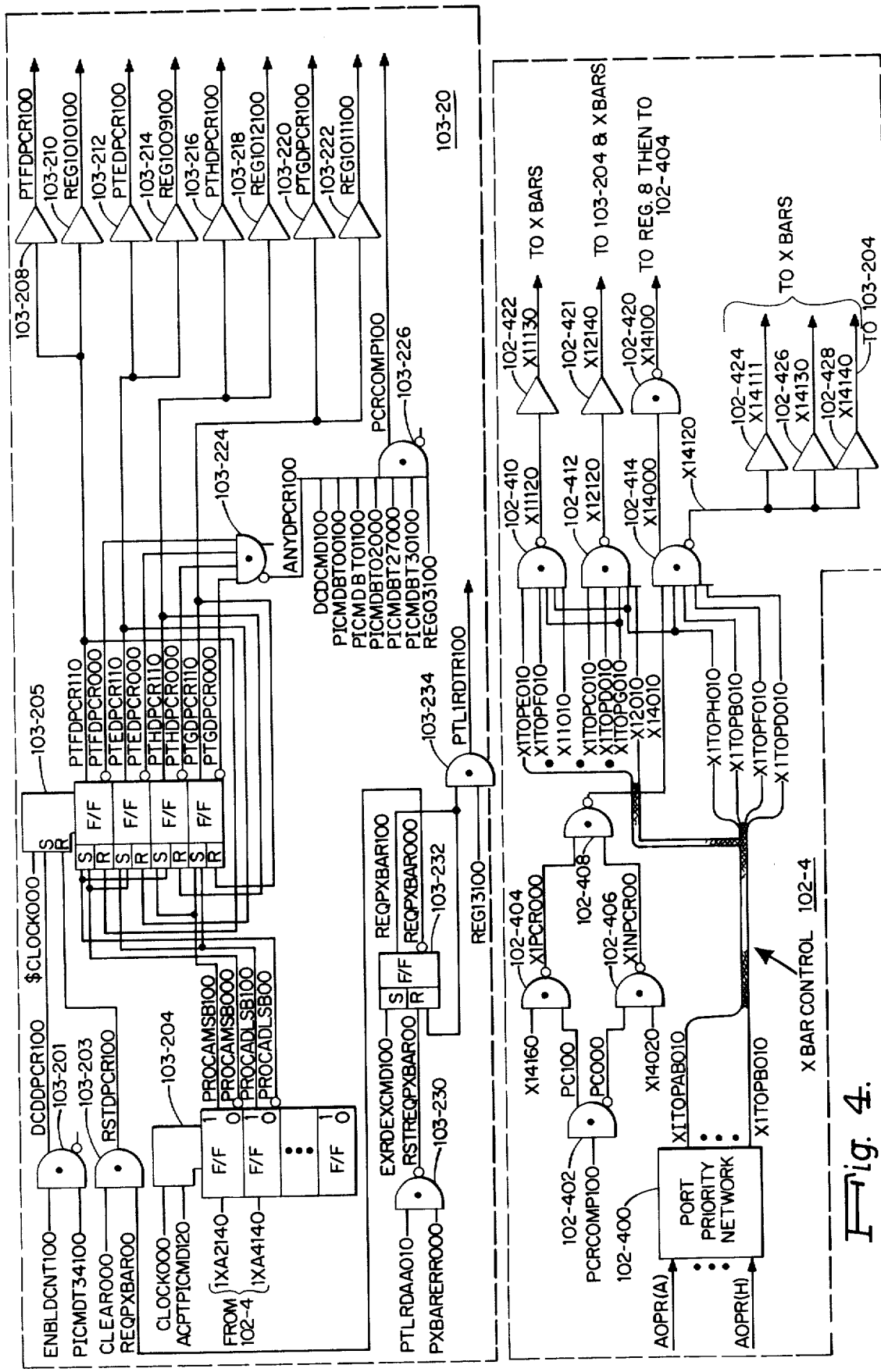
FIG. 4 illustrates in greater detail a portion of the circuits of FIGS. 3b and 3c in accordance with the present invention.
Figure 4B:
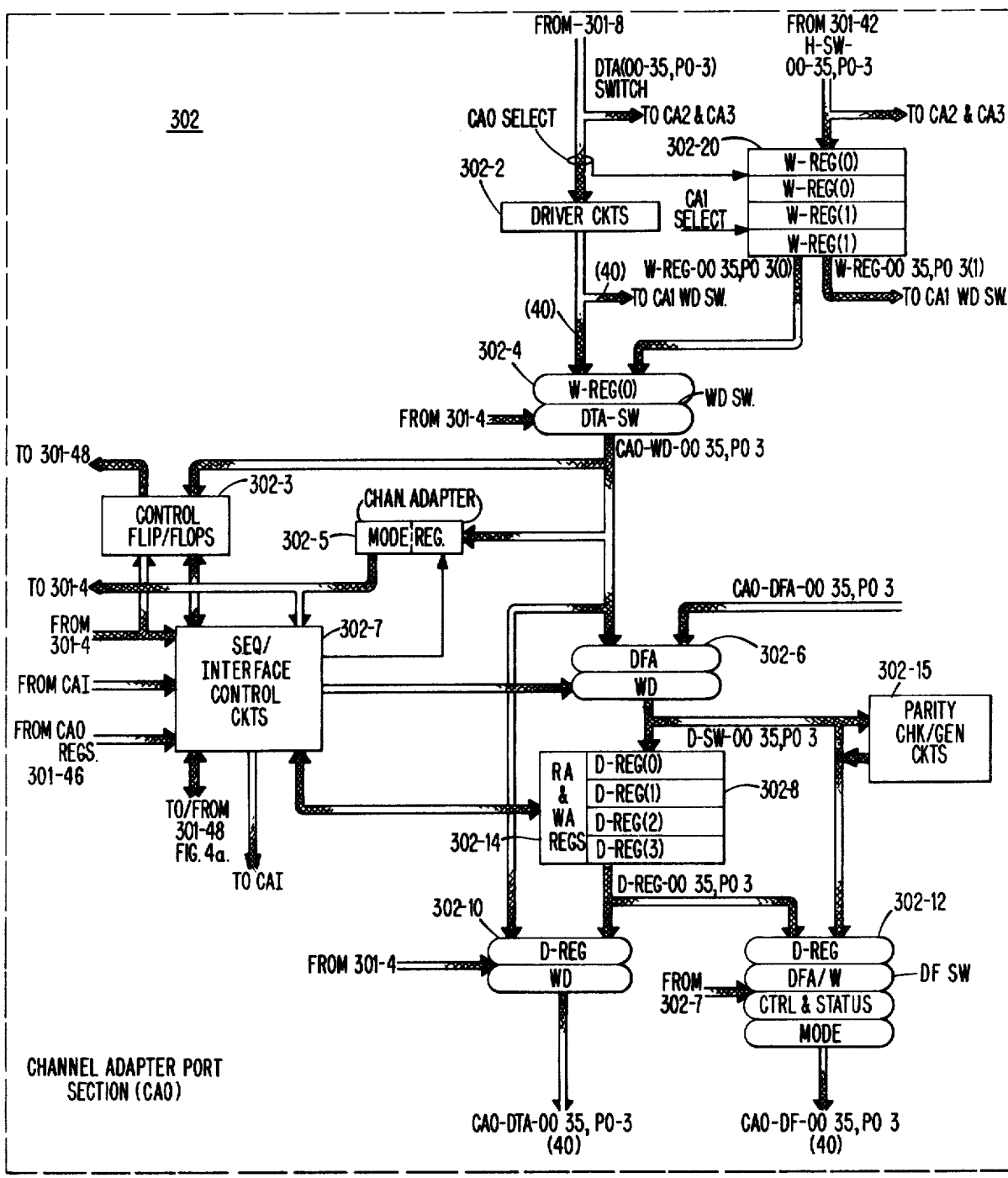

FIG. 4 illustrates in greater detail, the circuits within SIU 100 which respond to processor commands and control the switching of the crossbar circuits of FIG. 3b in accordance with the present invention.

Referring to FIG. 4, it is seen that a pair of NAND-/AND gates 103-203 generate signals DCDPCR100 and RSTDPCR100 respectively which are applied to a 4 bit register 103-205.

The gate 103-201 in response to an enable control signal ENBLDCNT100 and bit 34 of a PI command being set to a binary ONE corresponding to signal PICMDT34100 forces set signal DCDDPCR100 to a binary ONE. Gate 103-203 in response to a read register command signaled by signal REQPXBAR000 being forced to a binary ONE, in the absence of a clear signal (i.e., signal CLEAR00−1), forces reset signal RSTDPCR100 to a binary ONE.

The set signal DCDDPCR100 enables the register 103-205 to be loaded with signals which decode steering signals received via SDTS lines from the circuits of FIG. 3b. These signals 1XA2140 and 1XA4140 define which processor of a processor pair has issued a load control command to SIU 100 to set the DPCR line of the inactive processor to a binary ONE.

As seen from FIG. 4, the signals 1XA2140 and 1XA4140 are loaded into a register 203-204. The binary ONE and binary ZERO output signals from the two flip-flop register stages are combined as shown. The resulting combinations are applied to the set and reset inputs of the flip-flop stages of register 103-205. It will be noted that the result is such that the processor of a pair which generates the command can force the DPCR line of the other processor of the pair to a binary ONE.

The binary ONE output of register 103-205 connects via driver circuits 103-208 through 103-222 to different ones of the DPCR lines and to register 103-12. A NAND/AND gate 103-224 receives the binary ZERO output signals from each stage of register 103-205. The gate 103-224 forces signal ANYDPCR100 to a binary ONE when any of of the DPCR lines is forced to a binary ONE. A further NAND/AND gate 103-226 decodes the various PI command bit signals and forces signal PCRCOMP100 to a binary ONE in response to a PI command specifying the loading of wrap register 103-17 when signal ANYDPCR100 is a binary ONE.

A NAND/AND gate 103-230 and flip-flop 103-232 are used to reset the DPCR line following receipt of a next read register command by the SIU 100. More specifically, signal PTLRDAA10 is forced to a binary ONE in response to a read register command. This causes gate 103-230 to force signal RSTREQPX-BAR00 to a binary ZERO (i.e., signal PXBARERR000 is normally a binary ONE-no error). The signal RSTREQPXBAR00 causes flip-flop 103-232 to switch to a binary ZERO. When signal EXPDEXCMDOO is forced to a binary ONE in response to an external register command, this switches flip-flop 103-232 to a binary ONE. This in turn causes and AND gate 103-234 to switch signal PLLIRDTR100 to a binary ONE when signal REG13100 is a binary ONE.

The next group of circuits are included within block 102-4 of FIG. 3b. These circuits control the operation of the crossbar switching circuits 102-2 of FIG. 3b. However, it will be appreciated that the PDFS lines are being forwarded to SIU 100 rather than multiplexer 300.

Referring to FIG. 4, it is seen that the request lines AOPR from each port are applied to a priority network 102-400. The priority network 102-400 may be considered conventional in design and generates output signals XITOPAB010 through XITOPB010 indicating which port has the highest priority request. The post priority is as mentioned previously. The priority signals are applied to the control logic circuits of the crossbar switching networks.

More specifically, the NAND/AND gates 102-402 through 102-8 illustrate the control logic circuits pertaining to crossbar network 102-2. The signal PCRCOMP100 when forced to a binary ONE in turn selectively forces signal X14010 to a binary ONE or ZERO. The signals X14020 and X14160 represent the busy status of the crossbar network and establish the state of signal X14010.

The NAND/AND gates 102-410 through 102-414 together with the other circuits discussed above encode the 8 port priority signals into a 3 bit code which is applied to the crossbar network for selecting the data out lines of the appropriate processor. The two least significant bits of the code are applied to register 103-204. Since the processors connect only to ports E, F, G and H and these ports correspond to octal codes 4 through 7, thereby requiring use of only the two least significant bits to establish the source of the command. As seen from FIG. 4, the two least significant bit signals correspond to signals X14140 and X12140.

The signal X14000 is supplied to a further NAND gate 102-420 which in turn forwards the signal to the return steering lines RITM where appropriate. The signals X11130, X12120 and X14120 are applied via the driver circuits 102-422 through 102-428 to the crossbar networks and to the register 103-204 as mentioned previously.

DESCRIPTION OF OPERATION

The preferred embodiment of the present invention with reference to FIGS. 1 through 10b.

As discussed previously, the compare logic circuits 103-100 and 103-1 compare the sets of signals applied as outputs on each of the interface lines of processors G and H and E and F. For ease of explanation, the operation of one pair 200-0 or Po will be discussed herein.

During normal operation, the configuration register 103-15 has bits 33-34 both set to binary ONES indicating that both processors are operating in a "locked" or a compare mode for purposes of error detection (see FIG. 8a). The states of bits 33-34 of register 103-15 in turn place the STOP lines in a binary ZERO state. Hence, as seen from FIG. 2a, the RUN flip-flop 201-330 is set to a binary ONE enabling the clock circuits via signals RUNCLK100 and RUNCLK101 and cycling of control section 201 of each processor.

When a miscompare is detected, the SIU 100 operates to deconfigure or unlock the falty or bad processor. This is done by loading the desired bit pattern into bit positions 33 and 34 of the configuration register 103-15. This in turn caues the STOP line of the bad processor to be forced to a binary ZERO. As seen from FIG. 2a, this switches the RUN flip-flop 201-330 to a binary ZERO which "freezes" the state of the processor by stopping the operation of the clock circuits and control section 201. This occurs when signals RUNCLK100 and RUNCLK101 are forced to binary ZEROS.

It is seen from the above that the "bad" processor is rendered totally inactive since it is essential that its state be preserved. However, as mentioned previously, the inactive bad processor contains information which will facilitate greatly diagnosis of the reason for failure. For further information regarding the unlocking of processor pairs, reference should be made to the application "Input/Output Processing System Utilizing Locked Processors."

The apparatus of the present invention enables a good processor to have access to such information without causing any change in the state of the bad processor. The good processor of a logical processor pair in accordance with the present invention is able to gain access to internal status stored in the bad processor by first generating a load control command to the SIU 100 (i.e., port L). This command has the format of FIG. 7b wherein bit 34 of the command word is set to a binary ONE.

The PI command is applied via the network 102-2 of FIG. 3b to the PI command register 103-25 of FIG. 3c. As seen from FIG. 4, the signal PICMDT 34100 is forced to a binary ONE. This enables register 103-205 to be loaded with a bit pattern designating the inactive processor as established the states of signals 1XA2140 and 1XA4140. These signals, as mentioned previously, are obtained from the circuits of block 102-4 and indicate the processor by its port presenting the command. For example, when the processor connected to port G sends the command, signals 1XA2140 and 1XA4140 are forced to "10". This results in signal PTHDPCR110 being forced into a binary ONE. Alternatively, when processor H connected to port H sends the command, this results in signal PTFDPCR110 being forced to a binary ONE. A similar occurrence takes place with the processors connected to ports E and F. The signals from register 103-205 are also applied to SIU status register #2 and force the appropriate one of the bit positions 9-12 to a binary ONE (see FIG. 8d)

It will be noted that signal PCRCOMP100 is a binary ZERO since signal REGO3100 is a binary ZERO. This forces signal X14010 to a binary ONE which forces signal X14120 to a binary ZERO since the remaining signals are binary ONES when the processor connected to port G is the source of the command.

When one of the DPCR lines is forced to a binary ONE, this forces signal PTXDPCR100 to a binary ONE. As seen from FIG. 2a, this forces signal XBBPCR100 (most significant bit control) to a binary ONE and signal CNTLXBB100 (least significant bit control) to a binary ZERO. The two signals condition switch 204-8 to select the PSR/PCR position 2. At the same time, signal CSR30PCR100 is forced to a binary ZERO which conditions switch 204-4 to select the PCR position. Accordingly, the contents of the PCR register 204-22 are applied via switches 204-24 and 204-8 as input signals XBB00100 through XBB08100 to data out register 204-14. The data out clock enable signal ODRCE100 when switched to a binary ONE conditions circuit 201-306 to force signal WRITEDTSRG100 to a binary ONE which gates the PCR contents into data out register 204-14 in response to clocking signal DTS020.

At this time, the contents of PCR register 204-22 are stored in data out register 204-14 and are being applied to the DTS lines of the inactive processor.

Next, the active processor is operative to issue a load wrap register command to SIU 100. This command has the format illustrated in FIG. 7a wherein bit 30 is set to a binary ONE. Referring to FIG. 4, it is seen that this bit together with other signals force signal PCRCOMP100 to a binary ONE. The signal PCRCOMP100 forces signal X14010 to a binary ONE or binary ZERO as a function of the states of complementary signal X14160 and X14020 (i.e., signal X14160 =1=cmd from processor F or H; signal X14160=0=cmd from processor E or G). The result is that the NAND gate 102-414 signal X14120 is complemented in order to select the DTS lines from the inactive processor in lieu of th DTS lines of the active processor. It will be appreciated that since the above mentioned commands are only issued during test operations, only one processor will be active in the system. Hence, the state of signal X14010 is effective to complement the state of the least significant bit signal X14120.

Figure 10A:
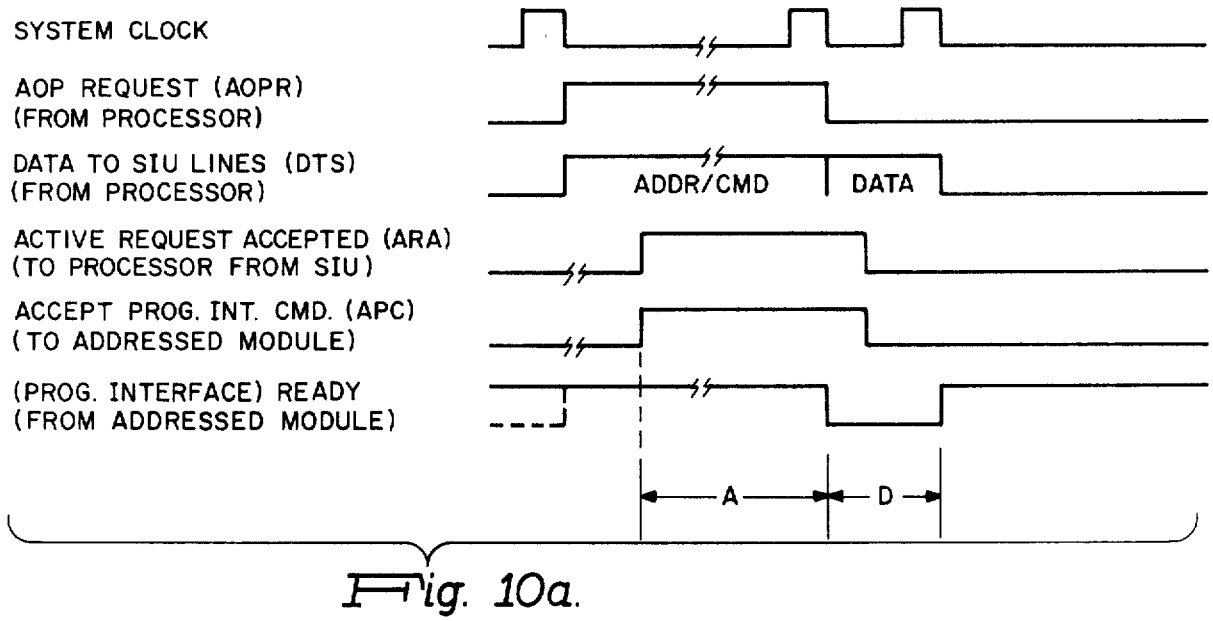
FIGS. 10a and 10b illustrate the signal sequences for transferring a WREX command.
Figure 10B:
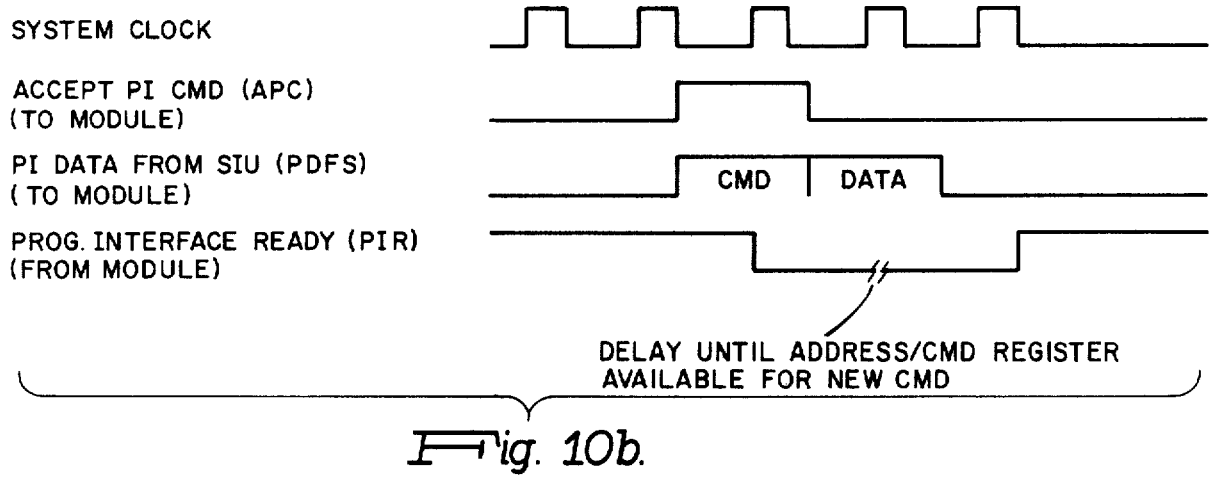

The PCR contents applied via the PDFS lines and data register 103-24 are loaded into wrap register 103-17. The sequence of signals are illustrated in FIG. 10a. It will be noted that the source of the command word is the active processor while the source of the data word is the inactive processor.

The DPCR lines are reset to binary ZEROS when the stages of register 103-205 are reset to binary ZEROS. This occurs when a read register command is directed to SIU 100. More specifically, the command resets flip-flop 103-232 to a binary ZERO which forces signal RSTDPCR100 to a binary ONE. This switches register 103-205 to all ZEROS in response to the next clock pulse.

From the above, it is seen how the arrangement of the present invention with a minimum of additional circuits is able to permit access to the internal information of a bad processor without altering the state of such processor.

It will be appreciated that many modifications may be made to the preferred embodiment. For example, the number of registers may be expanded to enable access to additional internal information in accordance with the present invention.

While in accordance with the provisions and statutes there has been illustrated and described the best forms of the invention known, certain changes may be made to the system described without departing from the spirit of the invention as set forth in the appended claims and, in some cases, certain features of the invention may be used to advantage without a corresponding use of other features.

What is claimed is:

1. A data processing system including a plurality of modules, said plurality of modules including at least a pair of input/output processing units, each processing unit including a plurality of storage elements including a number of control registers for storing status and control information required for program processing, data output means operatively coupled to said number of control registers for read out of the contents of said number of registers and clocking circuits for generating timing signals for enabling said input/output processing unit and a system interface unit having a plurality of interface ports and a number of transfer networks, each port connected to a different one of said modules and to said transfer networks, wherein said system interface unit controls the transfer of information between said ports, said system further including maintenance apparatus for facilitating diagnosis of failures within any one of said plurality of processing units detected as faulty comprising:

interface means included within the port of each input/output processing unit, said interface means being connected to said clocking circuits;

command register means for storing commands, command decode circuit means, and a plurality of registers included in said system interface unit, said command register means being connected to receive commands from any one of said number of transfer networks, said command decode circuit means connected to said command register means and operative to generate control signals in response to said commands, a first one of said registers being coupled to said interface means of each port for storing coded signals designating different configurations of at least a pair of said plurality of input/output processing units to be enabled for operation, said first register storing signals representative of an unlocked configuration bit pattern designating that only one of said pair is to be enabled and the other one of said pair of disabled for being faulty, said signals conditioning said interface means to inhibit the operation of the clocking circuits to the other one of said pair of input/output processing units having been detected as being faulty; and, control circuit means included in each of said input/output processing units, said control circuit means being coupled to said data output means, said clocking circuits and to said interface means, said command decode circuit means being operative in response to a predetermined sequence of commands from said one of said pair of input/output processing units to generate a sequence of control signals, said interface means of the port of said faulty processing unit in response to said control signals conditioning said control circuit means to enable said data output means to apply the contents of a predetermined one of said number of control registers to the one of said number of transfer networks connected to said port thereby not altering the state of said faulty processing unit defined by the status of said plurality of storage elements, and said one of said number of transfer networks being conditioned by said control signals to transfer said contents to one of said plurality of registers for use during subsequent fault analysis.

2. The system of claim 1 wherein each of said interfaces includes a plurality of control lines, a first one of said lines being switched to a first state to inhibit said operation of said clocking circuits in response to said coded signals stored in said first register, and a second one of said lines being connected to said control circuit means, and said second one of said lines being switched to a first state in response to said certain ones of said control signals conditioning said control circuit means to enable said data output means.

3. The system of claim 2 wherein each input/output processing unit further includes a microprogrammed control unit connected to said clocking circuits, said microprogrammed control unit storing sequences of microinstruction words for generating control signals for directing said operation of said input/output processing unit, said first line when switched to said first state inhibiting the operation of said clocking circuits preventing further operation of said microprogrammed control unit and freezing said state of said faulty input/output processing unit, and said second line when switched to said first state enabling said data output means for readout of said contents of one of said number of control registers without altering said state.

4. The system of claim 3 wherein the microprogrammed control unit of each input/output processing unit includes microinstruction words coded for generating said sequence of said commands.

5. The system of claim 2 wherein said system interface unit further includes a port priority network coupled to each of said ports, said priority network being operative to generate signals indicating which port has the highest priority request, and transfer control means for controlling the transfer of information between ports, said transfer control means being connected to the transfer networks of each of said input/output processing units, to said port priority network and to said command decode circuit means, said transfer control means in response to said signals from said priority network generating a number of coded signals for selecting one of said transfer networks corresponding to the input/output processing unit which generated a first one of said commands, said command decode circuit means in response to said number of coded signals switching said second line of the interface of said faulty processing unit to said first state to enable said control circuit means to apply said contents of said one transfer network.

6. The system of claim 5 wherein said command decode circut means includes:

a first register coupled to said transfer control means, said register being conditioned by the signals of said sequence generated in response to a first one of said sequence of commands to store indications of said coded signals specifying which one of said plurality of input/output processing units generated said first one of said commands; and, decoder circuit means connected to said first register means, said decoder circuit means being operative in response to said indications to generate signals for switching said second line of said interface of the input/output processing unit of said pair of which did not generate said first one of said commands.

7. The system of claim 6 wherein said command decode means further includes:

a second register connected to said decoder circuit means, said second register being conditioned by signals of said first command from said command register means to store indications of said signals generated by said decoder circuit means, said second register including a plurality of bistable bit positions corresponding in number to said plurality of input/output processing units;

circuit means connecting each bistable bit position to said second line of a different one of said interfaces; and, gating means connected to said command register means and to said second register, said gating means being operative in response to a second command in said sequence to cause said transfer control means to condition said contents to said one of said plurality of registers.

8. The system of claim 7 wherein said number of said plurality of input/output processing units includes first and second pairs designated as processing units G, H and E, F and wherein first and second pairs of said plurality of bistable bit positions are assigned to processing units F, E and H, G respectively, said decoder circuit means including conductor means for connecting different combinations of the outputs of said first register to the set and reset inputs of each of said bistable bit positions for switching one of the bit positions of a pair to a first state identifying said processing unit of said pair which did not generate said first one of said commands.

9. The system of claim 7 wherein said first one of said commands is of a first type coded to specify read out of a predetermined one of said number of control registers of said faulty processing unit and wherein said second one of said commands is of a second type coded to specify loading of a predetermined one of said plurality of registers of said system interface unit with said contents.

10. The system of claim 9 wherein said command decode means further includes reset circuit means connected to said command register means and to said second register means, said reset circuit means being operative in response to the next first type of command to reset said bistable bit positions of said second register means to binary ZEROS.

11. The system of claim 5 wherein said transfer control means includes:
 first gating means connected to said command decode means;
 second gating means connected to said first gating means and to transfer networks for receiving signals indicating the status; and,
 output gating means connected to said second gating means and to aid port priority network, said output gating means generating a predetermined one of said number of coded signals during a first one of said commands and said output gating means being conditioned by a second one of said commands to complement the state of a predetermined one of said number of coded signals for enabling the transfer of said contents from the transfer network of said faulty processing unit of said pair rather than the processing unit of said pair which generated said first command.

12. The system of claim 11 wherein said first gating means, said second gating means and said output gating means each include NAND gating circuits and wherein aid predetermined one of said number of coded signals corresponds to the least significant bit.

13. The system of claim 11 wherein said output gating means includes:
 circuit gating means connected to said port priority network, said circuit gating means generating the remaining ones of said number of coded signals for enabling said transfer network.

14. The system of claim 3 wherein said data output means includes switching means connected to each of said number of control registers and to said control circuit means, and
 wherein said control circuit means includes means for generating signals in response to the switching of said second line for selecting the contents of a predetermined one of said number of control registers for application to said one of said number of transfer networks.

15. A data processing system including a plurality of modules, said plurality of modules including at least a pair of input/output processing units, each processing unit including a plurality of storage elements including at least one control register for storing status and control information required for program processing and timing circuits for generating signals for enabling said processing unit and a system interface unit having a plurality of interface ports and a number of transfer networks, each port being connected to a differnt one of said modules and to said transfer networks wherein said system interface unit controls the transfer of information between said ports, said system further including maintenance apparatus for facilitating the diagnosis of faults within an inactive processing unit comprising:
 interface means included within the port of each input/output processing unit, said interface means being connected to said timing circuits;
 command register means for storing commands, command decode circuit means, and a plurality of registers included in said system interface unit, said command register means being connected to receive commands from any one of said number of transfer networks, said command decode circuit means connected to said command register means and operative to generate control siganls in response to said commands, a first one of said registers being coupled to said interface means of each port and for storing coded signals designating different configurations of said air of input/output processing units enabled for operation, said first register storing signals representative of an unlocked configuration bit pattern designating that only one of said pair is to be enabled for operation, said interface means being conditioned by said bit pattern to inhibit the operation of the timing circuits of the other one of said pair of input/output processing units rendering it inactive; and,
 control circuit means included in each of said input/output processing units, said control circuit means being coupled to said timing circuits and to said interface means,
 said command decode circuit means being operative in response to a first predetermined type of command from said one processing unit of said pair of input/output processing units to generate a first sequence of control signals, said interface means of said inactive processing unit being operative in response to said control signals to condition said control circuit means to apply the contents of said one control register to one of said number of transfer networks for use during fault analysis thereby not altering the state of said inactive processing unit defined by the status of said plurality of storage elements.

16. The system of claim 15 wherein said apparatus further includes transfer control means connected to the transfer networks of each of said processing units for controlling the transfer of information between ports, said command decode circuit means being operative in response to a second predetermined type of command from said one processing unit to a second sequence of control signals, said transfer control means being conditioned by said control signals to transfer said contents from said one transfer network to one of said plurality of registers of said system interface unit.

17. The system of claim 15 wherein each processing unit further includes data output means operatively coupled to said control register and each of said interfaces including a plurality of control lines, a first one of said lines being switched to a first state to inhibit said operation of said clocking circuits in response to said coded signals stored in said first register, and
 a second one of said lines being connected to said control circuit means, said second one of said lines being switched to a first state in response to said certain ones of said control signals conditioning said control circuit means to enable said data output means for readout of said contents without altering said state.

18. The system of claim 17 wherein each input/output processing unit further includes a microprogrammed control unit connected to said clocking circuits, said microprogrammed control unit storing sequences of microinstruction words for generating control signals for directing said operation of said input/output processing unit, said first line when switched to said first state inhibiting the operation of said clocking circuits preventing further operation of said microprogrammed control unit and freezing said state of said inactive input/output processing unit, and
 said second line when switched to said first state enabling said data output means for readout of said contents of said one control register without altering said state.

19. The system of claim 18 wherein said system interface unit further includes a port priority network coupled to each of said ports, said priority network being operative to generate signals indicating which port has the highest priority request, and said transfer control means being connected to said port priority network and to said command decode circuit means, said transfer control means in response to said signals from said priority network generating a number of coded signals for selecting one of said transfer networks corresponding to the input/output processing unit which generated said first command, said command decode circuit means in response to said number of coded signals switching said second line of the interface of said inactive processing unit to said first state to enable said control circuit means to apply said contents from said data output means to said one transfer network.

20. The system of claim 19 wherein said command decode circuit means includes:

a first register coupled to said transfer control means, said first register being conditioned by the signals of said sequence generated in response to said first command to store indications of said coded signals specifying which one of said plurality of input/output processing units generated said first command; and, decoder circuit means connected to said first register means, said decoder circuit means being operative in response to said indications to generate signals for switching said second line of said interface of the input/output processing unit of said pair which did not generate said first command.

21. The system of claim 20 wherein said command decode means further includes:

a second register connected to said decoder circuit means, said second register being conditioned by signals of said first command from said command register means to store indications of said signals generated by, said decoder circuit means, said register means including a plurality of bistable bit positions corresponding in number to said pair of input/output processing units; and, circuit means connecting said bistable bit position to said second line of a different one of said interfaces, gating means connected to said command register means and to said second register, said gating means being operative in response to a second command to cause said transfer control means to condition said one of said number of transfer networks to transfer said contents to said one of said plurality of registers.

22. The system of claim 21 wherein said transfer control means includes:

first gating means connected to said command decode means;

second gating means connected to said first gating means and to transfer networks for receiving signals indicating the status; and, output gating means connected to said second gating means and to said port priority network, said output gating means generating a predetermined one of said number of coded signals during said first command and said output gating means being conditioned by said second command to complement the state of a predetermined one of said number of coded signals for enabling the transfer of said contents from the transfer network of said inactive processing unit of said pair rather than the processing unit of said pair which generated said first command.

23. A data processing system comprising:

a plurality of modules, said plurality of modules including a plurality of input/output processing units, each processing unit including:

a number of control register for storing status and control information required for program processing;

data output means connected to said number of control registers for selection of any one of said number of registers;

timing circuits for enabling the operation of said processing unit;

interface means for transferring data and control signals to and from said processing unit, said interface means being connected to said timing circuits and to said control circuit means, and control circuit means coupled to said data output means, said timing circuits and to said interface means, and a system interface unit for controlling the transfer of information between said plurality of modules, said system interface unit including:

a plurality of interface ports, each connected to a different one of said modules;

a number of transfer networks connected to a different one of said plurality of input/output processing units;

command register means, said command register means being connected to receive commands from said number of transfer networks;

command decode circuit means coupled to said command register means, said command decode circuit means being operative to generate control signals in response to said commands, and a plurality of registers, a first one of said registers coupled to said interface means of each port and storing bit pattern signals codes for designating different operating configurations of pairs of said plurality of input/output processing units defining which processing units of said pairs are to be enabled for operation, said first register storing signals corresponding to a predetermined configuration, said signals conditioning said interface means to inhibit the operation of the timing circuits of a designated one processing unit of one of said pairs of input/output processing units rendering it inactive, and said command decode circuit means being operative in response to a first type of command from the other one of said one pair to generate a sequence of control signals, said interface means of the inactive processing unit in response to said control signals conditioning said control circuit means to cause said data output means to apply the contents of a selected one of said number of control registers for subsequent examination for diagnosis of faults within said inactive processing unit to one of said number of transfer networks thereby not altering the state of said inactive processing unit defined by the contents of said number of control registers.

24. The system of claim 23 wherein said system interface unit further includes transfer control means connected to the transfer networks of each of said processing units for controlling the transfer of information between ports, said command decode circuit means being operative in response to a second predetermined type of command from said other processing unit to a second sequence of control signals, said transfer control means being conditioned by said control signals to transfer said contents from said one transfer network to one of said plurality of registers of said system interface unit.

25. The system of claim 24 wherein each of said interfaces includes a plurality of control lines, a first one of said lines being switched to a first state to inhibit said operation of said clocking circuits in response to said coded signals stored in said first register, and
 a second one of said lines being connected to said control circuit means, said second one of said lines being switched to a first state in response to said control signals conditioning said control circuit means to enable said data output means for readout of said contents.

26. The system of claim 25 wherein each input/output processing unit further includes a microprogrammed control unit connected to said clocking circuits, said microprogrammed control unit storing sequences of microinstruction words for generating control signals for directing said operation for said input/output processing unit, said first line when switched to said first state inhibiting the operation of said clocking circuits preventing further operation of said microprogrammed control unit and freezing said state of said inactive input/output processing unit, and
 said second line when switched to said first state enabling said data output means for readout of said contents of one of said number of registers without altering said state.

27. The system of claim 25 wherein said system interface unit further includes a port priority network coupled to each of said ports, said priority network being operative to generate signals indicating which port has the highest priority request, and wherein
 said transfer control means is connected to said port priority network and to said command decode circuit means, said transfer control means in response to said signals from said priority network generating a number of coded signals for selecting one of said transfer networks corresponding to the input/output processing unit which generated said first command,
 said command decode circuit means in response to said number of coded signals switching said second line of the interface of said inactive processing unit to said first state to enable said control circuit means to apply said contents to said one transfer network.

28. The system of claim 27 wherein said command decode circuit means includes:
 a first register coupled to said transfer control means, said first register being conditioned by the signals of said sequence generated in response to said first command to store indications of said coded signals specifying which one of said plurality of input/output processing units generated said first command; and,
 decoder circuit means connected to said first register means, said decoder circuit means being operative in response to said indications to generate signals for switching said second line of said interface of the processing unit of said pair which did not generate said first command.

29. The system of claim 28 wherein said command decode means further includes:
 a second register connected to said decoder circuit means, said second register being conditioned by signals of said first command from said command register means to store indications of said signals generated by said decoder circuit means, said register means including a plurality of bistable bit positions corresponding in number to said plurality of input/output processing units;
 circuit means connecting each bistable bit position to said second line of a different one of said interfaces; and,
 gating means connected to said command register means and to said second register, said gating means being operative in response to a second command in said sequence to cause said transfer control means to condition the transfer networks of said pair of processing units for enabling the transfer of said contents to said one of said plurality of registers.

30. The system of claim 29 wherein said transfer control means includes:
 first gating means connected to said command decode means;
 second gating means connected to said first gating means and to transfer networks; and,
 output gating means connected to said second gating means and to said port priority network, said output gating means generating a predetermined one of said number of coded signals during a first one of said commands and said output gating means being conditioned by said second command to complement the state of a predetermined one of said number of coded signals for conditioning said transfer networks to enable the transfer of signals from the transfer network of said inactive processing unit of said pair rather than the transfer network of processing unit of said pair which generated said first command.

* * * * *